United States Patent
Cheung et al.

(10) Patent No.: US 11,227,602 B2
(45) Date of Patent: Jan. 18, 2022

(54) SPEECH TRANSCRIPTION USING MULTIPLE DATA SOURCES

(71) Applicant: Facebook Technologies, LLC, Menlo Park, CA (US)

(72) Inventors: Vincent Charles Cheung, San Carlos, CA (US); Chengxuan Bai, San Mateo, CA (US); Yating Sasha Sheng, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 114 days.

(21) Appl. No.: 16/689,662

(22) Filed: Nov. 20, 2019

(65) Prior Publication Data
US 2021/0151058 A1    May 20, 2021

(51) Int. Cl.
*G10L 17/00* (2013.01)
*G06F 3/01* (2006.01)
(Continued)

(52) U.S. Cl.
CPC .............. *G10L 17/00* (2013.01); *G06F 3/011* (2013.01); *G06K 9/00228* (2013.01);
(Continued)

(58) Field of Classification Search
CPC ......... G10L 25/63; G10L 25/57; G10L 25/21; G10L 25/93; G10L 25/30; G10L 25/78; G10L 15/25; G10L 15/26; G10L 15/265; G10L 17/00; G06F 3/011; G06T 19/006; H04R 3/005; H04R 1/406; G06K 9/00228; G06K 9/00671; G02B 27/0172;
(Continued)

(56) References Cited

U.S. PATENT DOCUMENTS

| 8,700,392 B1 | 4/2014 | Hart et al. |
| 9,324,320 B1 | 4/2016 | Stolcke et al. |

(Continued)

OTHER PUBLICATIONS

Pingali et al., "Audio-visual tracking for natural interactivity", MULTIMEDIA '99, Oct. 30-Nov. 5, 1999, pp. 373-382.
International Search Report and Written Opinion of International Application No. PCT/US2020/058432, dated Feb. 18, 2021, 12 pp.

*Primary Examiner* — Yogeshkumar Patel
(74) *Attorney, Agent, or Firm* — Shumaker & Sieffert, P.A.

(57) ABSTRACT

This disclosure describes transcribing speech using audio, image, and other data. A system is described that includes an audio capture system configured to capture audio data associated with a plurality of speakers, an image capture system configured to capture images of one or more of the plurality of speakers, and a speech processing engine. The speech processing engine may be configured to recognize a plurality of speech segments in the audio data, identify, for each speech segment of the plurality of speech segments and based on the images, a speaker associated with the speech segment, transcribe each of the plurality of speech segments to produce a transcription of the plurality of speech segments including, for each speech segment in the plurality of speech segments, an indication of the speaker associated with the speech segment, and analyze the transcription to produce additional data derived from the transcription.

18 Claims, 14 Drawing Sheets

(51) Int. Cl.
*G06K 9/00* (2006.01)
*G06T 19/00* (2011.01)
*G10L 25/63* (2013.01)
*H04R 1/40* (2006.01)
*H04R 3/00* (2006.01)

(52) U.S. Cl.
CPC ............ *G06T 19/006* (2013.01); *G10L 25/63* (2013.01); *H04R 1/406* (2013.01); *H04R 3/005* (2013.01)

(58) Field of Classification Search
CPC ........ G02B 27/0093; G02B 2027/0138; G02B 2027/014; G02B 2027/0178; H04N 7/157
See application file for complete search history.

(56) References Cited

U.S. PATENT DOCUMENTS

| | | | |
|---|---|---|---|
| 10,171,908 | B1 | 1/2019 | Sinkov et al. |
| 2002/0103649 | A1* | 8/2002 | Basson ................... G10L 25/78 704/270 |
| 2002/0178002 | A1* | 11/2002 | Boguraev ............ G06F 40/284 704/235 |
| 2007/0133437 | A1* | 6/2007 | Wengrovitz ............ G10L 15/26 370/260 |
| 2016/0275952 | A1* | 9/2016 | Kashtan ................ H04M 3/563 |
| 2018/0047395 | A1* | 2/2018 | Sommers ................ H04N 7/157 |
| 2018/0123813 | A1 | 5/2018 | Milevski et al. |
| 2018/0174600 | A1* | 6/2018 | Chaudhuri ......... H04N 21/4666 |
| 2019/0341050 | A1 | 11/2019 | Diamant et al. |

* cited by examiner

SPEECH TRANSCRIPTION USING MULTIPLE DATA SOURCES

TECHNICAL FIELD

This disclosure generally relates to speech transcription systems, and more particularly, to transcribing speech of multiple people.

BACKGROUND

Speech recognition is becoming increasing popular and are increasingly being added to televisions (TVs), computers, tablets, smart-phones, and speakers. For example, many smart devices can perform services based on user-spoken commands or questions. Such devices use speech recognition to identify, based on captured audio, the user's commands and questions and then perform an action or identify responsive information.

SUMMARY

In general, this disclosure describes a system and method for transcribing speech using audio, image, and other data. In some examples, a system may combine speech recognition, speaker identification, and visual pattern recognition techniques to produce a full transcription of an interaction between two or more users. For example, such a system may capture audio data and image data, recognize a plurality of speech segments in the audio data, identify a speaker associated with each speech segment based on the image data, and transcribe each of the plurality of speech segments to produce a transcription including an indication of the speaker associated with each speech segment. In some examples, artificial intelligence (AI)/machine learning (ML) models may be trained to recognize and transcribe speech from one or more identified speakers. In some examples, a system may recognize speech and/or identify speakers based on detecting one or more faces with moving lips in the image data. Such a system may further analyze the transcription to produce additional data from the transcription, including a calendar invitation for a meeting or event described in the transcription, information related to topics identified in the transcription, a task list including tasks identified in the transcription, a summary, notifications (e.g., to person(s) not present at the interaction, to the user about topics or persons discussed in the interaction), statistics (e.g., number of words spoken by the speaker, tone of the speaker, information about filler words used by the speaker, percent of time each speaker spoke, information about profanity used, information about the length of words used, the number of times "fillers" were used, speaker volume or speaker sentiment, etc.). In some examples, the speech transcription is performed in while the speech, conversations, or interactions are taking place in near or seemingly-near real-time. In other examples, the speech transcription is performed after the speech, conversations, or interactions have terminated.

In some examples, the techniques described herein are performed by either a head mounted display (HMD) or by a computing device with image capture devices (e.g., cameras) for capturing image data and audio capture devices (e.g., microphones) for capturing audio data. In some examples, the HMD or computing device may transcribe all of the speech segments captured for every user during an interaction between the users. In other examples, the HMD may transcribe the speech segments for only the user wearing the HMD, and the HMD, a computing device, and/or a transcription system may, optionally, combine the individual transcriptions received from other HMDs and/or computing devices.

In one or more example aspects, a system includes an audio capture system configured to capture audio data associated with a plurality of speakers, an image capture system configured to capture images of one or more of the plurality of speakers, and a speech processing engine configured to recognize a plurality of speech segments in the audio data, identify, for each speech segment of the plurality of speech segments and based on the images, a speaker associated with the speech segment, transcribe each of the plurality of speech segments to produce a transcription of the plurality of speech segments including, for each speech segment in the plurality of speech segments, an indication of the speaker associated with the speech segment, and analyze the transcription to produce additional data derived from the transcription.

In one or more further example aspects, a method includes capturing audio data associated with a plurality of speakers, capturing images of one or more of the plurality of speakers, recognizing a plurality of speech segments in the audio data, identifying, for each speech segment of the plurality of speech segments and based on the images, a speaker associated with the speech segment, transcribing each of the plurality of speech segments to produce a transcription of the plurality of speech segments including, for each speech segment in the plurality of speech segments, an indication of the speaker associated with the speech segment, and analyzing the transcription to produce additional data derived from the transcription.

In one or more additional example aspects, a computer-readable storage medium includes instructions that, when executed, configure processing circuitry of a computing system to capture audio data associated with a plurality of speakers, capture images of one or more of the plurality of speakers, recognize a plurality of speech segments in the audio data, identify, for each speech segment of the plurality of speech segments and based on the images, a speaker associated with the speech segment, transcribe each of the plurality of speech segments to produce a transcription of the plurality of speech segments including, for each speech segment in the plurality of speech segments, an indication of the speaker associated with the speech segment, and analyze the transcription to produce additional data derived from the transcription.

These techniques have various technical advantage and practical applications. For example, techniques in accordance with one or more aspects of the present disclosure may provide a speech transcription system that can generate additional data from a transcription. By automatically generating additional data, a system in accordance with the techniques of this disclosure can provide services to a user without the user having to speak specific words (e.g., "wake" words) that signal to the system that a command or question has been uttered or will be uttered, and possibly without specific commands or instructions. This can facilitate user interaction with the system, making interactions more consistent with how a user might interact with another user, and thereby making interactions with the system more natural.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
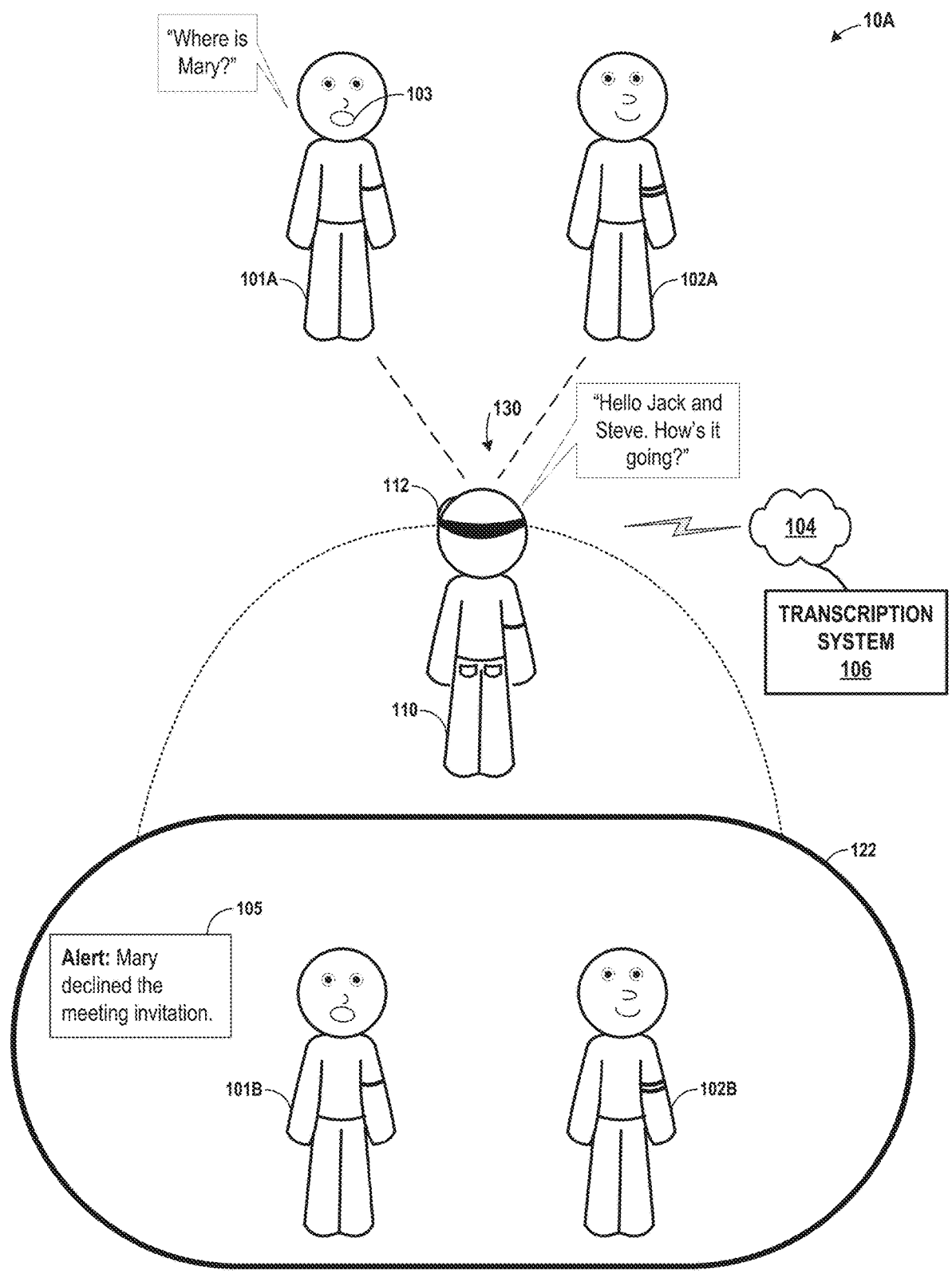
FIG. 1A is an illustration depicting an example system that performs speech transcriptions in accordance with the techniques of the disclosure.

FIG. 1A is an illustration depicting system 10A that performs speech transcriptions in accordance with the techniques of the disclosure. In the example of FIG. 1A, system 10A is an artificial reality system that includes head mounted device (HMD) 112. As shown, HMD 112 is typically worn by user 110 and includes an electronic display and optical assembly for presenting artificial reality content 122 to user 110. In addition, HMD 112 includes one or more motion sensors (e.g., accelerometers) for tracking motion of the HMD 112, one or more audio capture devices (e.g., microphones) for capturing audio data of the surrounding physical environment, and one or more image capture devices (e.g., cameras, infrared (IR) detectors, Doppler radar, line scanners) for capturing image data of the surrounding physical environment. HMD 112 is illustrated as being in communication, via network 104, with transcription system 106, which may correspond to a computing resource in any form. For example, transcription system 106 may be a physical computing device or may be a component of a cloud computing system, server farm, and/or server cluster (or portion thereof) that provides services to client devices and other devices or systems. Accordingly, transcription system 106 may represent one or more physical computing devices, virtual computing devices, virtual machines, containers, and/or other virtualized computing device. In some example implementations HMD 112 operates as a stand-alone, mobile artificial reality system.

Network 104 may be the internet, or may include or represent any public or private communications network or other network. For instance, network 104 may be or may include a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 104 using any suitable communication techniques. Network 104 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 1B may be operatively coupled to network 104 using one or more network links.

In general, artificial reality system 10A uses information captured from a real-world, 3D physical environment to render artificial reality content 122 for display to user 110. In the example of FIG. 1A, user 110 views the artificial reality content 122 constructed and rendered by an artificial reality application executing on HMD 112. Artificial reality content 122A may correspond to content rendered pursuant to a virtual or video conferencing application, a social interaction application, a movement instruction application, an alternative world application, a navigation application, an educational application, gaming application, training or simulation applications, augmented reality application, virtual reality application, or other type of applications that implement artificial reality. In some examples, artificial reality content 122 may comprise a mixture of real-world imagery and virtual objects, e.g., mixed reality and/or augmented reality.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors, such as external cameras, to capture 3D information within the real world, physical environment, such as motion by user 110. Based on the sensed data, the artificial reality application determines a current pose for the frame of reference of HMD 112 and, in accordance with the current pose of the HMD 112, renders the artificial reality content 122.

More specifically, as further described herein, the image capture devices of HMD 112 capture image data representative of objects in the real world, physical environment that are within a field of view 130 of image capture devices 138. These objects can include persons 101A and 102A. Field of view 130 typically corresponds with the viewing perspective of HMD 112.

FIG. 1A depicts a scene in which user 110 interacts with persons 101A and 102A. Both persons 101A and 102A are in the field of view 130 of HMD 112, allowing HMD 112 to capture audio data and image data of persons 101A and 102A. HMD 112A may display persons 101B and 102B in artificial reality content 122 to user 110, corresponding to persons 101A and 102A, respectively. In some examples, persons 101B and/or 102B may be unaltered images of persons 101A and 102A, respectively. In other examples, person 101B and/or person 102B may be an avatar (or any other virtual representation) corresponding to person 101B and/or person 102B.

In the example shown in FIG. 1A, user 110 says "Hello Jack and Steve. How's it going?" and person 101A responds "Where is Mary?" During the scene, HMD 112 captures image data and audio data and a speech processing engine of HMD 112 (not shown) may be configured to recognize speech segments in the captured audio data and identify a speaker associated with each speech segment. For example, the speech processing engine may recognize speech segments "Hello Jack and Steve. How's it going?" and "Where is Mary?" in the audio data. In some examples, the speech processing engine may recognize individual words (e.g., "Hello," "Jack," "and," "Steve" and so on) or any combination of one or more words as speech segments. In some examples, speech processing engine may identify user 110 as the speaker of "Hello Jack and Steve. How's it going?" based on a stored voice recognition model for user 110 (e.g., based on attributes of the speech segments being similar to the stored voice recognition model) and/or sound intensity (e.g., volume).

In some examples, the speech processing engine may be configured to detect faces with moving lips in the image data to recognize speech segments (e.g., the start and end of a speech segment) and/or identify a speaker. For example, the speech processing engine may detect faces for persons 101A and 102A and detect that mouth 103 of person 101A is moving while capturing audio associated with the speech segment "Where is Mary?" Based on this information, the speech processing engine may determine person 101A as the speaker of that speech segment. In another example, the speech processing engine may determine person 101A is the speaker because user 110 is focusing on person 101A while he is speaking (e.g., while person 101A's lips are moving and audio data is being captured). In some examples, the speech processing engine also obtains other information, such as, for example, location information (e.g., GPS coordinates) or calendar information to identify the speakers or to identify potential speaker models. For example, the speech processing engine may use calendar meeting information to identify persons 101A and 102A.

The speech processing engine may transcribe each of the speech segments to produce a transcription including an indication of the speaker associated with each speech segment. The speech processing engine may also analyze the transcription to produce additional data derived from the transcription. For instance, in the example shown in FIG. 1A, the speech processing engine may transcribe the speech segment "Where is Mary?", analyze calendar information, and determine that Mary declined the meeting invitation. The speech processing engine may then generate an alert 105 and display that alert to user 110 in artificial reality content 122. In this way, the speech processing engine may assist user 110 in responding to person 101A.

The speech processing engine may produce other additional data, such as a calendar invitation for a meeting or event described in the transcription, information related to topics identified in the transcription, or a task list including tasks identified in the transcription. In some examples, the speech processing engine may generate notifications. For example, the processing engine may generate a notification indicating that person 101A is asking about Mary and transmit that notification to Mary. In some examples, the speech processing engine may produce statistics about the transcription including number of words spoken by the speaker, tone of the speaker, speaker volume, information about filler words used by the speaker, percent of time each speaker spoke, information about profanity used, information about the length of words used, a summary of the transcription, or sentiment of the speaker. The speech processing engine may also produce a modified version of the speech segments associated with at least one of the plurality of speakers. For example, the speech processing engine may generate an audio or video file with the voices of one or more speakers replaced by another voice (e.g., the voice of a cartoon character or the voice of a celebrity) or replacing one or more speech segments in an audio or video file.

In some examples, the speech processing engine may be included in the transcription system 106. For example, HMD 112 may capture audio and image data and transmit audio and image data to transcription system 106 over network 104. Transcription system 106 may recognize speech segments in the audio data, identify a speaker associated with each of the speech segments, transcribe each of the speech segments to produce a transcription including an indication of the speaker associated with each speech segment, and analyze the transcription to produce additional data derived from the transcription.

One or more of the techniques described herein may have various technical advantages and practical applications. For example, a speech transcription system in accordance with one or more aspects of the present disclosure can generate additional data from a transcription. By automatically generating additional data, a system in accordance with the techniques of this disclosure can provide services to a user without the user having to speak "wake" words or even enter commands or instructions. This can facilitate user interaction with the system, making interactions more consistent with how a user might interact with another user, and thereby making interactions with the system more natural.

Figure 1B:
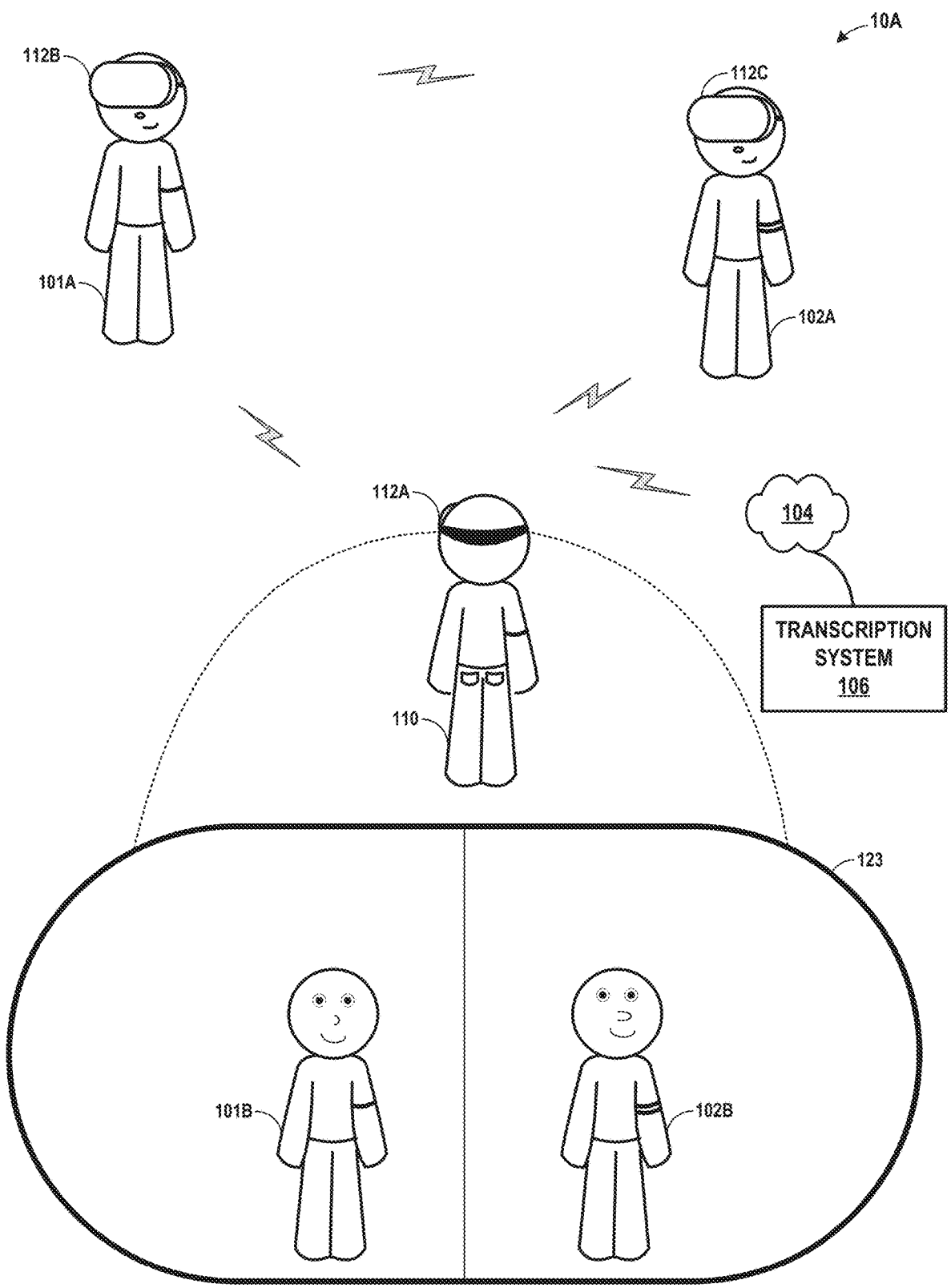
FIG. 1B is an illustration depicting an example system that performs speech transcriptions in accordance with the techniques of the disclosure.

FIG. 1B is an illustration depicting an example system that performs speech transcriptions in accordance with the techniques of the disclosure. In this example, user 110 is wearing 112A, person 101A is wearing HMD 112B, and person 102A is wearing 112C. In some examples, users 110, 101A, and/or 103A may be in the same physical environment or in different physical environment. In FIG. 1B, HMD 112A may display persons 101B and 102B in artificial reality content 123 to user 110. In this example, artificial reality content 123 comprises a virtual conferencing application including a video stream and an audio stream from each of HMDs 112B and 112C. In some examples, persons 101B and/or 102B may be unaltered images of persons 101A and 102A, respectively. In other examples, person 101B and/or person 102B may be an avatar (or any other virtual representation) corresponding to person 101B and/or person 102B.

In the example shown in FIG. 1B, HMDs 112A, 112B, and 112C (collectively, "HMDs 112") wirelessly communicate with each other (e.g., directly or via network 104). Each of HMDs 112 may include a speech processing engine (not shown). In some examples, each of HMDs 112 may operate in substantially the same way as HMD 112 of FIG. 1A. In some examples, HMD 112A may store a first speech recognition model corresponding to user 110, HMD 112B may store a second speech recognition model corresponding to user 101A, and HMD 112C may store a third speech recognition model corresponding to user 102A. In some examples, each of HMDs 112 may share and store copies of the first, second, and third speech recognition models.

In some examples, each of HMDs 112 obtains audio data and/or image data. For example, each of HMDs 112 may capture audio data and image data from its physical environment and/or obtain audio data and/or image data from the other HMDs 112. In some examples, each HMD 112 may transcribe the speech segments corresponding to the user wearing the HMD. For example, HMD 112A might only transcribe the one or more speech segments corresponding to user 110, HMD 112B might only transcribe the one or more speech segments corresponding to user 101A, and HMD 112C might only transcribe the one or more speech segments corresponding to user 102A. For instance, in such an example, HMD 112A will capture audio data and/or image data from its physical environment, recognize speech segments in the audio data, identify the speech segments corresponding to user 110 (e.g., based on a stored speech recognition model for user 110), and transcribe each of the speech segments corresponding to user 110. Each of HMDs 112 will transmit their individual transcriptions to transcription system 106. System 106 will combine the individual transcriptions to produce a complete transcription and analyze the full transcription to produce additional data derived from the full transcription. In this way, each of HMDs 112 need to not store a speech recognition model for other users. Moreover, each HMD 112 transcribing speech from the corresponding user may improve transcription and/or speaker identity accuracy.

In other examples, each of the HMDs 112 may capture audio and image data and transmit audio and image data to transcription system 106 over network 104 (e.g., in audio and video streams). Transcription system 106 may recognize speech segments in the audio data, identify a speaker associated with each of the speech segments, transcribe each of the speech segments to produce a transcription including an indication of the speaker associated with each speech segment, and analyze the transcription to produce additional data derived from the transcription.

Figure 1C:
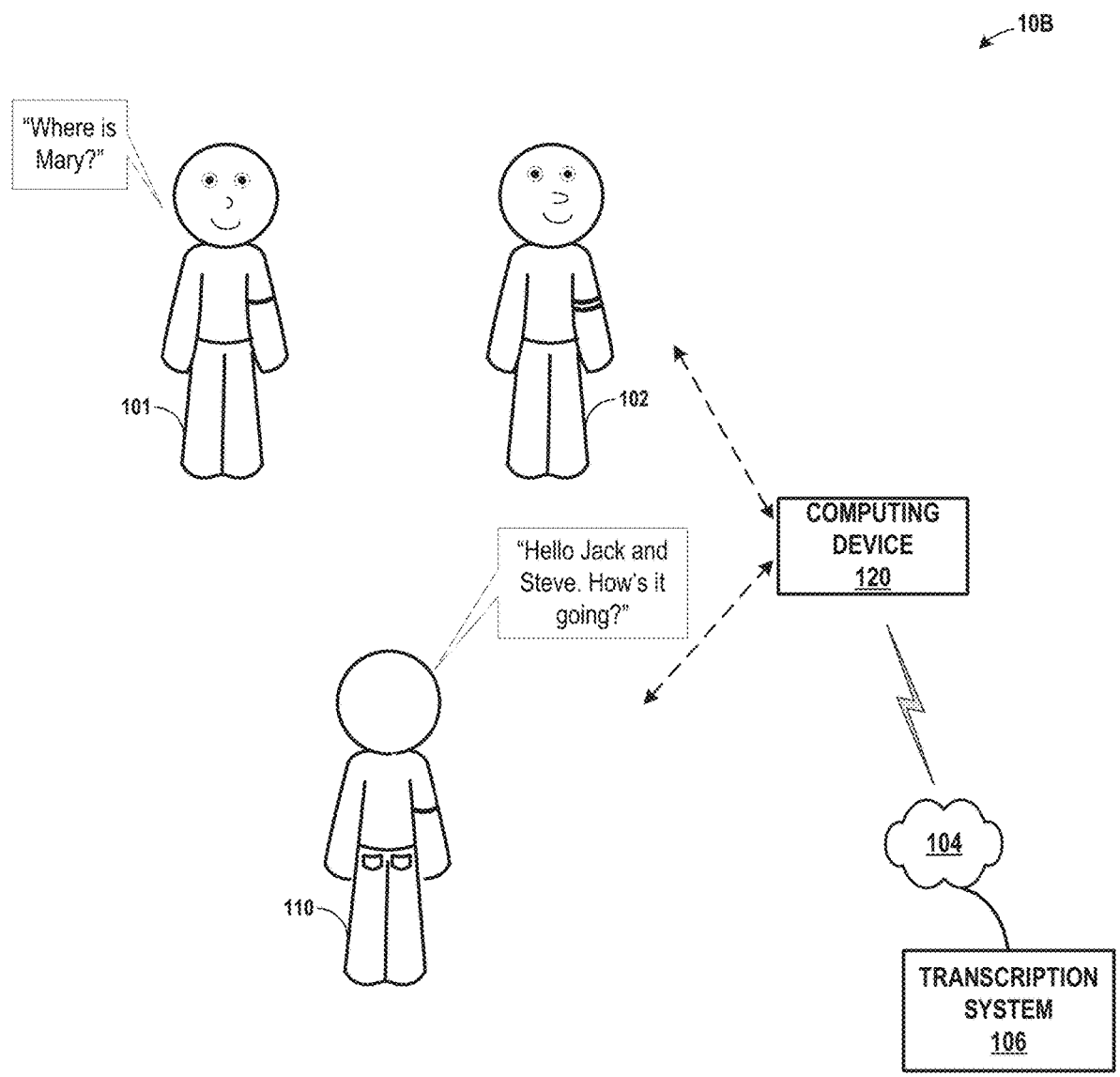
FIG. 1C is an illustration depicting an example system that performs speech transcriptions in accordance with the techniques of the disclosure.

FIG. 1C is an illustration depicting an example system 10B that performs speech transcriptions in accordance with the techniques of the disclosure. In this example, users 110, 101, and 102 are in the same physical environment and computing device 120 captures audio and/or image data. In other examples, one or more other users located in a different physical environment may be part of an interaction, facilitated by computing device 120, with users 110, 101, and 102. Computing device 120 in FIG. 1C is shown as a single computing device, which may correspond to a mobile phone, a tablet, a smart watch, a gaming console, workstation, a desktop computer, laptop, assistant device, special-purpose tabletop device, or other computing device. In other examples, computing device 120 may be distributed across a plurality of computing devices.

In some examples, computing device 120 can perform similar transcription operations as described above with reference to HMDs 112 in FIGS. 1A and 1B. For example, a speech processing engine of computing device 120 (not shown) may recognize speech segments in the audio data, identify a speaker associated with each of the speech segments, transcribe each of the speech segments to produce a transcription including an indication of the speaker associated with each speech segment, and analyze the transcription to produce additional data derived from the transcription. In another example, computing device 120 captures audio and/or image data, transmits the audio and/or image data to transcription system, and the speech processing engine of transcription system 106 then recognizes speech segments in the audio data, identifies a speaker associated with each of the speech segments, transcribes each of the speech segments to produce a transcription including an indication of the speaker associated with each speech segment, and analyzes the transcription to produce additional data derived from the transcription.

In examples where computing device 120 is facilitating interactions involving remote users and/or users in different physical environments, computing device 120 may use audio information and any indications of image or video information (e.g., audio and/or video streams) from devices corresponding to the remote users to recognize speech segments in the audio stream(s), identify the speaker (e.g., remote user) associated with each of the speech segments in the audio stream(s), transcribe each of the speech segments to produce a transcription including an indication of the speaker (including remote speakers) associated with each speech segment, and analyze the transcription to produce additional data derived from the transcription.

Figure 2A:
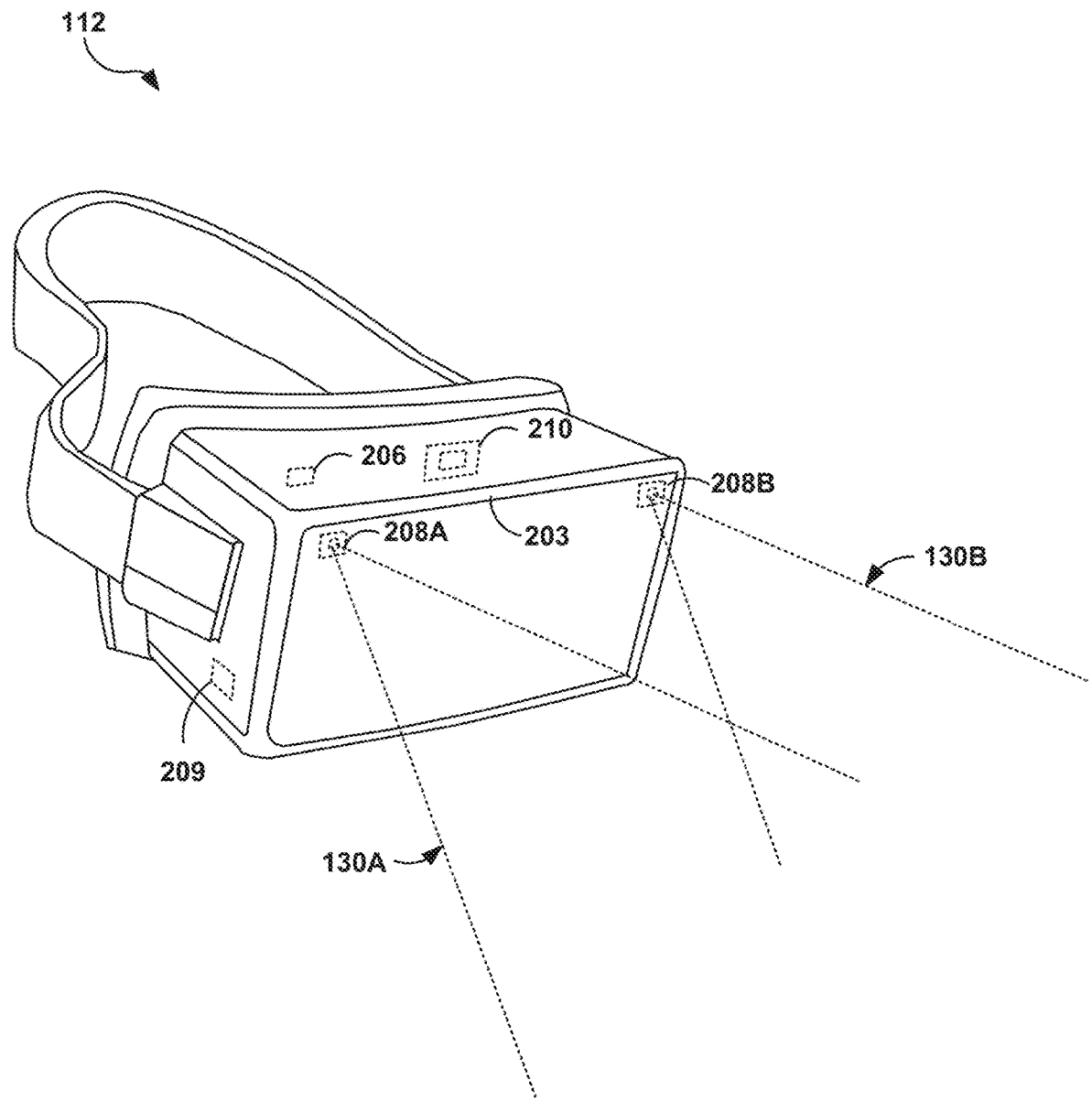
FIG. 2A is an illustration depicting an example HMD in accordance with techniques of the disclosure.

FIG. 2A is an illustration depicting an example HMD 112 configured to operate in accordance with one or more techniques of this disclosure. HMD 112 of FIG. 2A may be an example of HMD 112 of FIG. 1A or HMDs 112A, 112B, and 112C of FIG. 1B. HMD 112 may operate as a stand-alone, mobile artificial realty system configured to implement the techniques described herein or may be part of a system, such as system 10A of FIGS. 1A, 1B.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. The frame of reference may also be used in tracking the position and orientation of HMD 112. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 208A and 208B (collectively, "image capture system 208," which may include any number of image capture devices) (e.g., video cameras, still cameras, IR scanners, UV scanners, laser scanners, Doppler radar scanners, depth scanners) and audio capture system 209 (e.g., microphones) configured to capture raw image and audio data, respectively. In some aspects, image capture system 208 can capture image data from a visible spectrum and an invisible spectrum of the electromagnetic spectrum (e.g., IR light). The image capture system 208 may include one or more image capture devices that capture image data from the visible spectrum and one or more separate image capture devices that capture image data from the invisible spectrum, or these may be combined in the same one or more image capture devices. More specifically, image capture system 208 capture image data representative of objects in the physical environment that are within a field of view 130 of image capture system 208, which typically corresponds with the viewing perspective of HMD 112, and audio capture system 209 capture audio data within a vicinity of HMD 112 (e.g., within 360 degree range of the audio capture devices). In some examples, audio capture system 209 may comprise a microphone array that may capture information about the directionality of the audio source with respect to HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to recognize speech segments in the audio data captured with audio capture system 209, identify a speaker associated with each speech segment, transcribe each of the speech segments to produce a transcription of the plurality of speech segments including an indication of the speaker associated with each speech segment, and analyze the transcription to produce additional data derived from the transcription. In some examples, control unit 210 causes the audio data and/or image data to be transmitted to transcription system 106 over network 104 (e.g., in near-real time, or seemingly near-real time as the audio data and/or image data is captured, or after an interaction is completed).

Figure 2B:
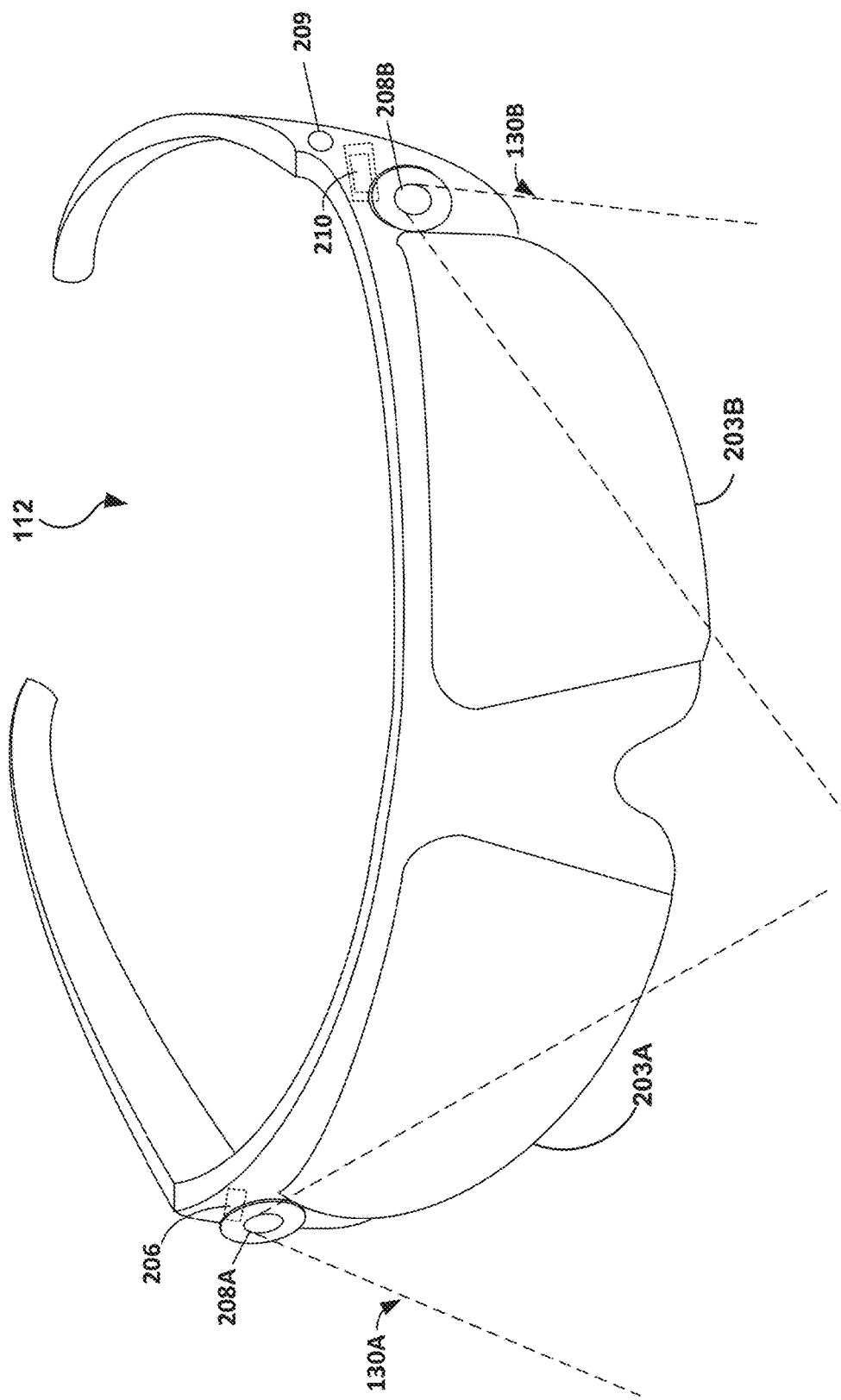
FIG. 2B is an illustration depicting an example HMD in accordance with techniques of the disclosure.

FIG. 2B is an illustration depicting an example HMD 112, in accordance with techniques of the disclosure. As shown in FIG. 2B, HMD 112 may take the form of glasses. HMD 112 of FIG. 2A may be an example of any of HMD 112 of FIGS. 1A, 1B. HMD 112 may be part of a system, such as system 10A of FIGS. 1A-1B, or may operate as a stand-alone, mobile system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 208A and 208B (collectively, "image capture system 208") (e.g., video cameras, still cameras, IR scanners, UV scanners, laser scanners, Doppler radar scanners, depth scanners) and audio capture system 209 (e.g., microphones), configured to capture image and audio data, respectively. In some aspects, image capture system 208 can capture image data from a visible spectrum and an invisible spectrum of the electromagnetic spectrum (e.g., IR light). The image capture system 208 may include one or more image capture devices that capture image data from the visible spectrum and one or more separate image capture devices that capture image data from the invisible spectrum, or these may be combined in the same one or more image capture devices. More specifically, image capture system 208 capture image data representative of objects in the physical environment that are within a field of view 130 of image capture system 208, which typically corresponds with the viewing perspective of HMD 112, and audio capture system 209 capture audio data within a vicinity of HMD 112 (e.g., within 360 degree range of the audio capture devices). HMD 112 includes an internal control unit 210, which may include an internal power source and one or more printed-circuit boards having one or more processors, memory, and hardware to provide an operating environment for executing programmable operations to process sensed data and present artificial reality content on display 203. In accordance with the techniques described herein, control unit 210 of FIG. 2B is configured to operate similarly to control unit 210 of FIG. 2A.

Figure 3:
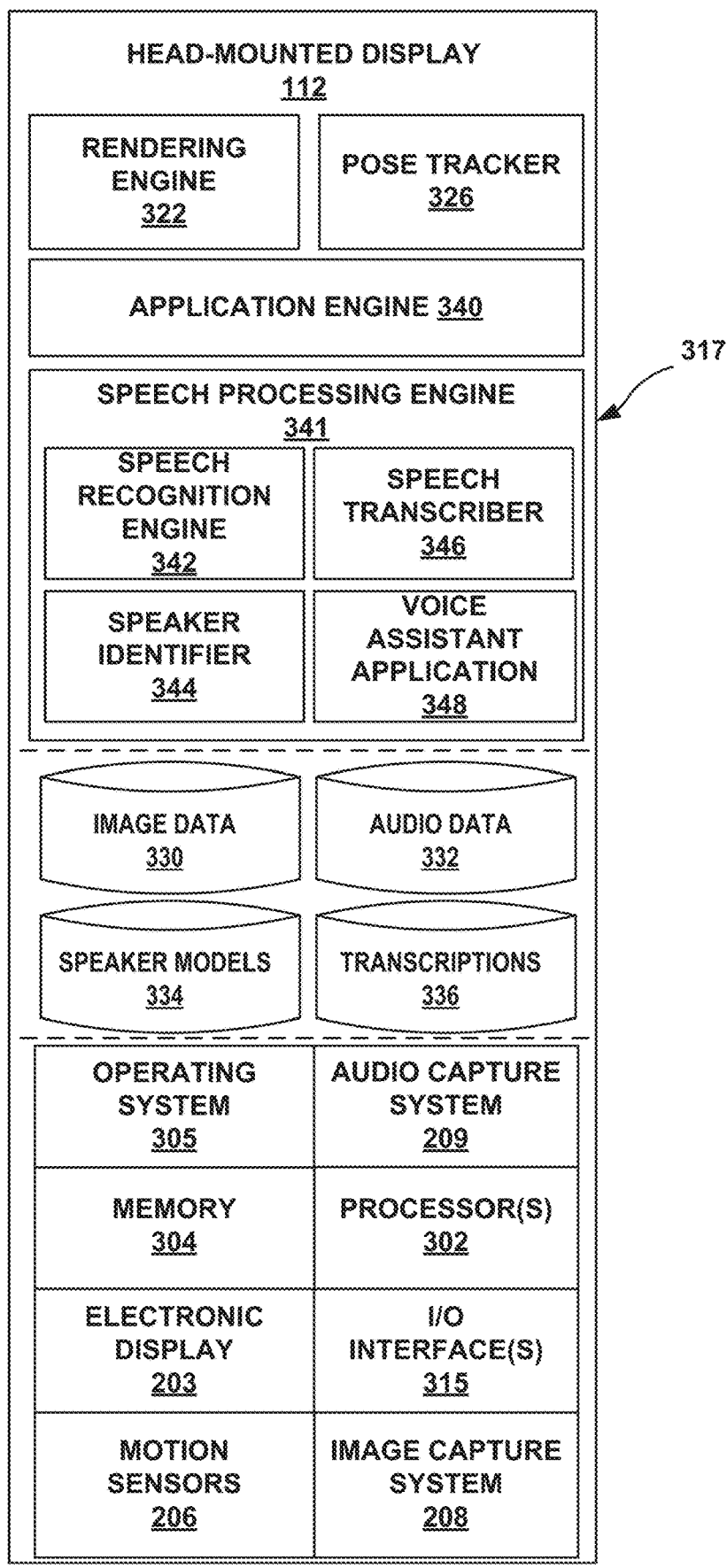
FIG. 3 is a block diagram depicting an example in which speech transcription is performed by an example instance of the HMD of the artificial reality systems of FIGS. 1A, 1B, in accordance with the techniques of the disclosure.

FIG. 3 is a block diagram depicting an example in which speech transcription is performed by an example instance of HMD 112 of the artificial reality systems of FIGS. 1A, 1B, in accordance with the techniques of the disclosure. In the example of FIG. 3, HMD 112 performs image and audio data capture, speaker identification, transcription, and analysis operations in accordance with the techniques described herein.

In this example, HMD 112 includes one or more processors 302 and memory 304 that, in some examples, provide a computer platform for executing an operating system 305, which may be an embedded, real-time multitasking operating system, for instance, or other type of operating system.

In turn, operating system 305 provides a multitasking operating environment for executing one or more software components 317. Processors 302 are coupled to one or more I/O interfaces 315, which provide I/O interfaces for communicating with other devices such as display devices, image capture devices, other HMDs, and the like. Moreover, the one or more I/O interfaces 315 may include one or more wired or wireless network interface controllers (NICs) for communicating with a network, such as network 104. Additionally, processor(s) 302 are coupled to electronic display 203, motion sensors 206, image capture system 208, and audio capture system 209. In some examples, processors 302 and memory 304 may be separate, discrete components. In other examples, memory 304 may be on-chip memory collocated with processors 302 within a single integrated circuit. Image capture system 208 and audio capture system 209 are configured to obtain image data and audio data, respectively.

In general, application engine 320 includes functionality to provide and present an artificial reality application, e.g., a transcription application, a voice assistant application, a virtual conferencing application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on HMD 112. Responsive to control by application engine 320, rendering engine 322 generates 3D artificial reality content for display to the user by application engine 340 of HMD 112.

Application engine 340 and rendering engine 322 construct the artificial content for display to user 110 in accordance with current pose information for HMD 112 within a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112 and user commands, to capture 3D information within the real-world environment, such as motion by user 110, and/or feature tracking information with respect to user 110. In some examples, application engine 340 and rendering engine 322 can generate and render for display one or more user interfaces for a transcription application or a voice assistant application in accordance with the techniques of this disclosure. For example, application engine 340 and rendering engine 322 may generate and render for display a user interface for displaying transcription and/or additional data.

Software applications 317 of HMD 112 operate to provide an overall artificial reality application, including a transcription application. In this example, software applications 317 include rendering engine 322, application engine 340, pose tracker 326, speech processing engine 341, image data 330, audio data 332, speaker models 334, and transcriptions 336. In some examples, HMD 112 may store other data including location information, calendar event data for the user (e.g., invited persons, confirmed persons, meeting topic), etc. (e.g., in memory 304). In some examples, image data 330, audio data 332, speaker models 334, and/or transcriptions 336 may represent a repository or a cache.

Speech processing engine 341 performs functions relating to transcribing speech in audio data 332 and analyzes the transcription in accordance with techniques of this disclosure. In some examples, speech processing engine 341 includes speech recognition engine 342, speaker identifier 344, speech transcriber 346, and voice assistant application 348.

Speech recognition engine 342 performs functions relating to recognizing one or more speech segments in audio data 332. In some examples, speech recognition engine 342 stores the one or more speech segments in audio data 332 (e.g., separate from the raw analog data). A speech segment can include one or more spoken words. For example, a speech segment can be single words, two or more words, or even phrases or complete sentences. In some examples, speech recognition engine 342 uses any speech recognition techniques to recognize one or more speech segments in audio data 332. For example, audio data 332 may comprise analog data and speech recognition engine 342 may convert the analog data to digital data using an analog-to-digital converter (ADC), filter noise in the digitized audio data, and apply one or more statistical models (e.g., a Hidden Markov Model or neural networks) to the filtered digitized audio data to recognize the one or more speech segments. In some examples, the speech recognition engine 342 may apply an artificial intelligence (AI)/machine learning (ML) model trained to recognize speech for one or more specific users (e.g., user 110 of FIGS. 1A-1C). In some examples, the AI/ML models may receive training feedback from the user to adjust the speech recognition determinations. In some examples, speech recognition engine 342 may recognize one or more speech segments in audio data 332 based on image data 330. For example, speech recognition engine 342 may be configured to detect faces with moving lips in the image data to recognize speech segments (e.g., the start and end of a speech segment).

Speaker identifier 344 performs functions relating to identifying a speaker associated with each of the one or more speech segments recognized by the speech recognition engine 342. For example, speaker identifier 344 may be configured to detect faces with moving lips in image data 330 to identify a speaker or potential speakers. In another example, audio capture system 209 may comprise a microphone array that may capture information about the directionality of the audio source with respect to HMD 112, and speaker identifier 344 may identify a speaker or potential speakers based on that directionality information and image data 330 (e.g., speaker identifier 344 may identify person 101A in FIG. 1 based on the directionality information about the speech segment "Where is Mary?"). In yet another example, the speaker identifier 344 will identify the speaker based on who the user focuses on (e.g., based on the field of view of the HMD 112). In some examples, speaker identifier 344 may determine a hash value or embedding value for each speech segment, obtain potential speaker models (e.g., from speaker models 334), compare the hash value to the potential speaker models, and identify the closest speaker model to the hash value. Speaker identifier 344 may identify potential speaker models based on external data, image data 330 (e.g., based on detected faces with moving lips), and/or user input. For example, speaker identifier 344 may identify potential speakers based on calendar information (e.g., information about confirmed or potential meeting invitees), one or more faces identified in image data 330, location information (e.g., proximity information of persons or devices associated with other persons relative to HMD 112), and/or based on potential speaker models selected via user input. In some examples, if the difference between the hash value for a speech segment and the closest speaker models is equal to or greater than a threshold difference, speaker identifier 344 may create a new speaker model based on the hash value and associate the new speaker model to the speech segment. If the difference between the hash value for a speech segment and the closest speaker models is less than the threshold difference, speaker identifier 344 may identify the speaker associated with the closest speaker model as the speaker of the speech segment. In some examples, speaker models 334 may comprise hash values (or other voice attributes) for different speakers. In some examples, speaker models 344 may comprise AI/ML models trained to identify speech for one or more speakers (e.g., persons 110, 101, 102 of FIGS. 1A-1C). In some examples, the AI/ML models may receive training feedback from the user to adjust speaker identification determinations. The speaker models 334 may also include a speaker identifier (ID), name, or label that is automatically generated by speaker identifier 344 (e.g., "Speaker 1," "Speaker 2," etc.) or manually entered by a user (e.g., "Jack," "Steve", "boss", etc.) via I/O interfaces 315. In some examples, the speaker models 344 may each include one or more images of a speaker and/or a hash value for the speaker's face.

In some examples, speaker identifier 344 may be configured to identify the speech segments attributed to the user of HMD 112. For example, speaker identifier 344 may apply a speaker model specific to the user of HMD 112 (e.g., user 110) to identify the one or more speech segments associated with the user (e.g., identify the speech segments spoken by user 110 based on attributes of the speech segments being similar to the user speaker model). In other words, speaker identifier 344 may filter the one or more speaker segments recognized by speech recognition engine 342 for the speech segment(s) spoken by the user of HMD 112.

Speech transcriber 346 perform functions relating to transcribing speech segments recognized by speech recognition engine 342. For example, speech transcriber 346 produces text output of the one or more speech segments recognized by speech recognition engine 342 with an indication of the one or more speakers identified by speaker identifier 344. In some examples, speech transcriber 346 produces text output of the one or more speech segments recognized by speech recognition engine 342 that are associated with the user of HMD 112 (e.g., user 110). In other words, in some examples, speech transcriber 346 only produces text output for the one or more speech segments spoken by the user of HMD 112, as identified by speaker identifier 344. Either way, speech transcriber 346 then stores the text output in transcriptions 336.

Voice assistant application 348 performs functions relating to analyzing the transcription to produce additional data derived from the transcription. For example, voice assistant application 348 may produce additional data such as a calendar invitation for a meeting or event described in the transcription (e.g., corresponding to speech segment "Let's touch base again first thing Friday morning"), information related to topics identified in the transcription (e.g., a notification that a meeting invitee rejected the meeting invitation as shown in FIG. 1A, a notification to a person not present in an interaction), or a task list including tasks identified in the transcription (e.g., a task item corresponding to speech segment "Please send out the sales report for last month after the meeting."). In some examples, the voice assistant application 348 may produce statistics about the transcription including number of words spoken by the speaker, tone of the speaker, information about filler words used by the speaker (e.g., um, hmm, uh, like, etc.) percent of time each speaker spoke, information about profanity used, information about the length of words used, a summary of the transcription, or sentiment of the speaker. Voice assistant application 348 may also produce a modified version of the speech segments associate with at least one of the plurality of speakers. For example, voice assistant application 348 may generate an audio or video file with the voices of one or more speakers replaced by another voice (e.g., the voice of a cartoon or the voice of a celebrity) or replacing the language of one or more speech segments in an audio or video file.

As described above, speaker models 334 may include various AI/ML models. These AI/ML models may include artificial neural networks (ANNs), decision trees, support vector networks, Bayesian networks, genetic algorithms, linear regression, logistic regression, linear discriminant analysis, naïve Bayes, k-nearest neighbors, learning vector quantization, support vector machines, random decision forests, or any other known AI/ML mathematical models. These AI/ML models may be trained to process audio data and recognize speech segments and/or identify speaker of speech segments. For example, these AI/ML models may be trained to recognize speech and/or particular voices in audio data 332. In some examples, these AI/ML models may be trained to identify potential speakers in image data. For example, these AI/ML models may be trained to recognize persons (e.g., faces) and/or moving lips in image data 330. In some examples, speaker models 334 may be trained with a set of speech data for one or more users and/or a set of images corresponding to one or more users. In one or more aspects, the information stored in each of image data 330, audio data 332, speaker models 334, and/or transcriptions 336 can be stored in a repository, a database, a map, a search tree, or any other data structure. In some examples, image data 330, audio data 332, speaker models 334, and/or transcriptions 336 may be separate from HMD 112 (e.g., may be separate database(s) in communication with HMD 112 over network 104 of FIG. 1A).

Motion sensors 206 can include sensors such as one or more accelerometers (also referred to as inertial measurement units or "IMUs") that output data indicative of current acceleration of HMD 112, radar or sonar that output data indicative of distances of HMD 112 from various objects, or other sensors that provide indications of a location or orientation of HMD 112 or other objects within a physical environment.

Figure 4:
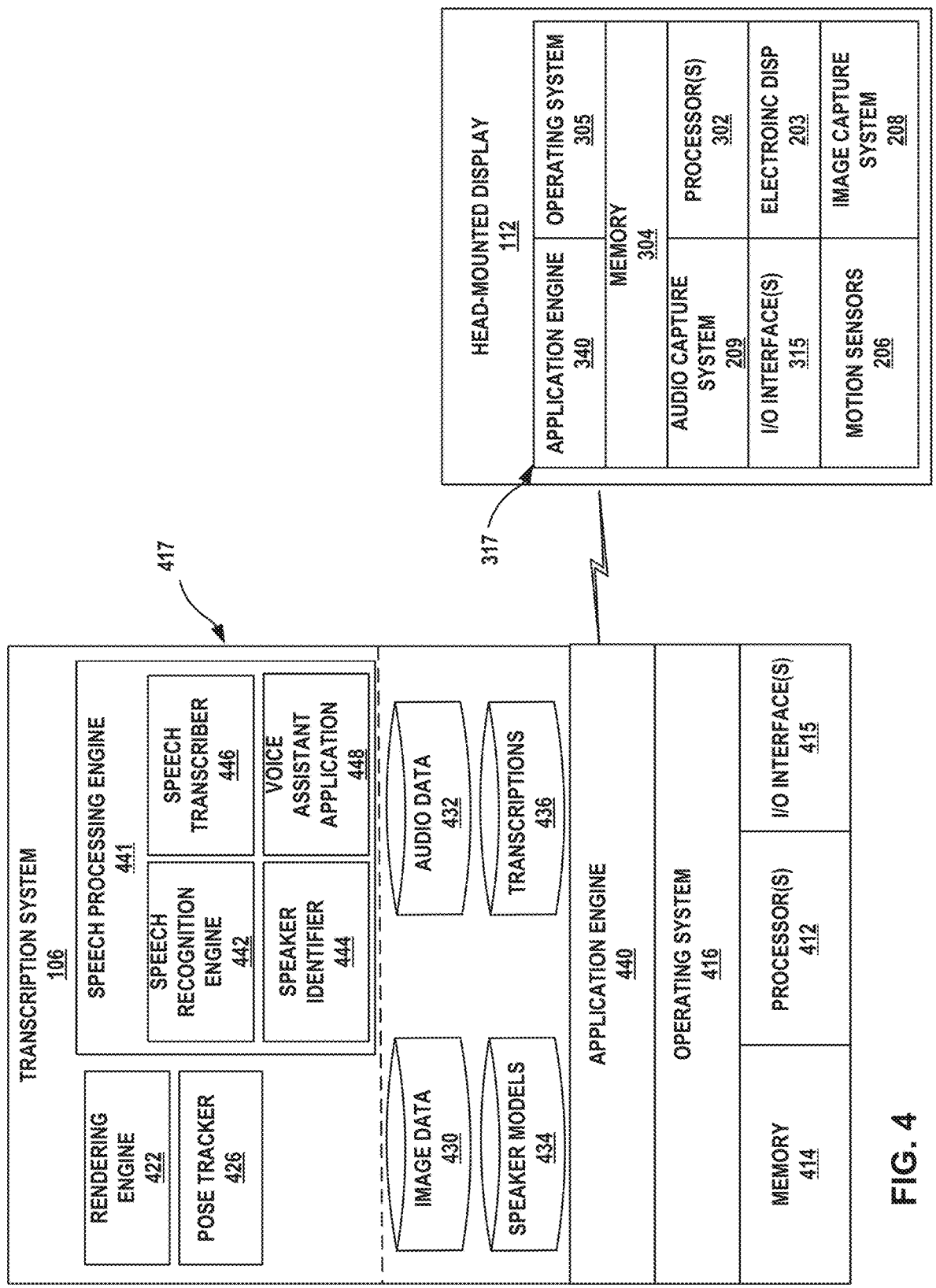
FIG. 4 is a block diagram showing example implementations in which speech transcription is performed by example instances of the transcription system and the HMD of the artificial reality systems of FIGS. 1A, 1B, in accordance with the techniques of the disclosure.

FIG. 4 is a block diagram showing example implementations in which speech transcription is performed by example instances of the transcription system and the HMD of the artificial reality systems of FIGS. 1A, 1B, in accordance with the techniques of the disclosure. In the example of FIG. 4, HMD 112 captures audio and/or image data and transmits the audio and/or image data to transcription system 106. Speech recognition engine 441 of transcription system 106 recognizes speech segments in the audio data, identifies a speaker associated with each of the speech segments, transcribes each of the speech segments to produce a transcription including an indication of the speaker associated with each speech segment, and analyzes the transcription to produce additional data derived from the transcription, in accordance with one or more of the techniques described herein.

In this example, and in a manner similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Moreover, processor(s) 302 are coupled to electronic display 203, motion sensors 206, image capture system 208, and audio capture system 209. In some examples, HMD 112 further includes any of the other components shown in FIG. 3. For example, HMD 112 may include speech processing engine 341 (including speech recognition engine 342, speaker identifier 344, speech transcriber 346, and voice assistant application 348), image data 330, audio data 332, speaker models 334, and transcriptions 336.

In general, transcription system 106 is a device that processes audio and/or image data received from HMD 112 to produce a transcription including an indication of one or more speakers in speech segments contained in the audio data and to produce additional data from the additional data derived from the transcription. In some examples, transcription system 106 is a single computing device, such as a server, a workstation, a desktop computer, a laptop, or gaming system. In other examples, at least a portion of transcription system 106, such as processors 412 and/or memory 414, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, transcription system 106 includes one or more processors 412 and memory 414 that, in some examples, provide a computer platform for executing an operating system 416, which may be an embedded, real-time multitasking operating system, for instance, or other type of operating system. In turn, operating system 416 provides a multitasking operating environment for executing one or more software components 417. Processors 412 are coupled to one or more I/O interfaces 415, which provide I/O interfaces for communicating with other devices, such as a keyboard, a mouse, game controllers, display devices, image capture devices, HMDs, and the like. Moreover, the one or more I/o interfaces 415 may include one or more wired or wireless network interface controllers (NICs) for communicating with a network, such as network 104. Each of processors 302, 412 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 414 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 417 of transcription system 106 operate to provide a transcription application. In this example, software applications 417 include rendering engine 422, application engine 440, pose tracker 426, speech processing engine 441, image data 430, audio data 432, speaker models 434, and transcriptions 436. Similar to speech processing engine 341 of FIG. 3, speech processing engine 441 includes speech recognition engine 442, speaker identifier 444, speech transcriber 446, and voice assistant application 448.

In general, application engine 440 includes functionality to provide and present an artificial reality application, e.g., a transcription application, a voice assistant application, a virtual conferencing application, a gaming application, a navigation application, an educational application, training or simulation applications, and the like. Application engine 440 may include, for example, one or more software packages, software libraries, hardware drivers, and/or Application Program Interfaces (APIs) for implementing an artificial reality application on computing system 120. Responsive to control by application engine 440, rendering engine 422 generates 3D artificial reality content for display to the user by application engine 340 of HMD 112.

Application engine 440 and rendering engine 422 perform functions relating to constructing the artificial content for display to user 110 in accordance with current pose information for HMD 112 within a frame of reference, typically a viewing perspective of HMD 112, as determined by pose tracker 426. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112, such as image data 430 from sensors on HMD 112, and, in some examples, data from external sensors, such as external cameras, to capture 3D information within the real world environment, such as motion by user 110 and/or feature tracking information with respect to user 110. Based on the sensed data, computing system 120 constructs the artificial reality content for communication, via the one or more I/O interfaces 315, 415, to HMD 112 for display to user 110. In some examples, application engine 440 and rendering engine 422 can generate and render for display one or more user interfaces for a multimedia query application in accordance with the techniques of this disclosure. For example, application engine 440 and rendering engine 422 may generate and render for display a user interface for displaying transcription and/or additional data.

Speech recognition engine 442 performs functions relating to recognizing one or more speech segments in the audio data 432 received from HMD 112 (e.g., as described above with reference to speech recognition engine 342 of FIG. 3). In some examples, speech recognition engine 442 stores the one or more speech segments in audio data 432 (e.g., separate from the raw analog data). A speech segment can include one or more spoken words. For example, a speech segment can be single words, two or more words, or even phrases or complete sentences.

Speaker identifier 444 performs functions relating to identifying a speaker associated with each of the one or more speech segments recognized by the speech recognition engine 442. For example, speaker identifier 444 may be configured to detect faces with moving lips in image data 430 to identify a speaker or potential speakers. In another example, audio capture system 209 of HMD 112 may comprise a microphone array that may capture information about the directionality of the audio source with respect to HMD 112, and speaker identifier 444 may identify a speaker or potential speakers based on that directionality information and image data 430 (e.g., speaker identifier 444 may identify person 101A in FIG. 1 based on the directionality information about the speech segment "Where is Mary?"). In yet another example, the speaker identifier 444 will identify the speaker based on who the user focuses on (e.g., based on the field of view of the HMD 112).

In some examples, speaker identifier 444 may determine a hash value or embedding value for each speech segment, obtain potential speaker models (e.g., from speaker models 434), compare the hash value to the potential speaker models, and identify the closest speaker model to the hash value. Speaker identifier 444 may identify potential speaker models based on external data, image data 430 received from HMD 112 (e.g., based on detected faces with moving lips), and/or user input. For example, speaker identifier 344 may identify potential speakers based on calendar information (e.g., information about confirmed or potential meeting invitees), one or more faces identified in image data 430 received from HMD 112, location information (e.g., proximity information of persons or devices associated with other persons relative to HMD 112), and/or based on potential speaker models selected via user input. In some examples, if the difference between the hash value for a speech segment and the closest speaker models is equal to or greater than a threshold difference, speaker identifier 444 may create a new speaker model based on the hash value and associates the new speaker model to the speech segment. If the difference between the hash value for a speech segment and the closest speaker models is less than the threshold difference, speaker identifier 444 identifies the speaker associated with the closest speaker model as the speaker of the speech segment. In some examples, speaker models 434 may comprise hash values for different speakers.

In some examples, speaker identifier 444 may be configured to identify the speech segments attributed to the user of HMD 112. For example, speaker identifier 444 may apply a speaker model specific to the user of HMD 112 (e.g., user 110) to identify the one or more speech segments associated with the user (e.g., identify the speech segments spoken by user 110 based on attributes of the speech segments being similar to the user speaker model).

Similar to speech transcriber 346 described above with respect to FIG. 3, speech transcriber 446 performs functions relating to transcribing the one or more speech segments recognized by speech recognition engine 442. For example, speech transcriber 446 produces text output of the one or more speech segments recognized by speech recognition engine 442 with an indication of the one or more speakers identified by speaker identifier 444, and stores the text output in transcriptions 436. In some examples, speech transcriber 346 only produces text output for the one or more speech segments spoken by the user of HMD 112, as identified by speaker identifier 444. In some examples, speech processing engine 441 transmits the text output to HMD 112.

Voice assistant application 448 performs functions relating to analyzing the transcription to produce additional data derived from the transcription. For example, voice assistant application 448 may produce additional data such as a calendar invitation for a meeting or event described in the transcription (e.g., corresponding to speech segment "Let's touch base again first thing Friday morning"), information related to topics identified in the transcription (e.g., a notification that a meeting invitee rejected the meeting invitation as shown in FIG. 1A, a notification to a person not present in an interaction), or a task list including tasks identified in the transcription (e.g., a task item corresponding to speech segment "Please send out the sales report for last month after the meeting."). In some examples, the voice assistant application 448 may produce statistics about the transcription including number of words spoken by the speaker, tone of the speaker, information about filler words used by the speaker (e.g., um, hmm, uh, like, etc.) percent of time each speaker spoke, information about profanity used, information about the length of words used, a summary of the transcription, or sentiment of the speaker. Voice assistant application 448 may also produce a modified version of the speech segments associate with at least one of the plurality of speakers. For example, voice assistant application 348 may generate an audio or video file with the voices of one or more speakers replaced by another voice (e.g., the voice of a cartoon or the voice of a celebrity) or replacing the language of one or more speech segments in an audio or video file. In some examples, speech processing engine 441 transmits the additional data to HMD 112.

Similar to speaker models 334 described above with respect to FIG. 3, speaker models 434 may include various AI/ML models. These AI/ML models may be trained to process audio data and recognize speech segments and/or identify speaker of speech segments. For example, these AI/ML models may be trained to recognize speech and/or particular voices in audio data 432. In some examples, these AI/ML models may be trained to identify potential speakers in image data. For example, these AI/ML models may be trained to recognize persons (e.g., faces) and/or moving lips in image data 430. In some examples, speaker models 334 may be trained with a set of speech data for one or more users and/or a set of images corresponding to one or more users. In some examples, the AI/ML models may receive training feedback from a user (e.g., via I/O interfaces 415) to adjust speaker identification determinations. The speaker models 334 may also include a speaker identifier, name, or label that is automatically generated by speaker identifier 344 (e.g., "Speaker 1," "Speaker 2," etc.) or manually entered by a user (e.g., "Jack," "Steve", "boss", etc.) via I/O interfaces 415. In some examples, the speaker models 344 may each include one or more images of a speaker and/or a hash value for the speaker's face.

In some examples, transcription system 106 receives audio and/or image data from two or more HMDs (e.g., HMDs 112 of FIG. 1B). In some examples, each HMD may transmit audio and/or image data of the same physical environment or from different physical environment (e.g., as shown in FIG. 1B). By capturing audio and/or image data about the same environment from two or more different sources, a greater amount of information may be captured. For example, image data may be captured from two or more different perspective or audio data may be captured from two different points of an environment, which may enable different sounds to be captured. In some examples, transcription system 106 produces a single transcription from the data received from all HMDs.

Figure 5:
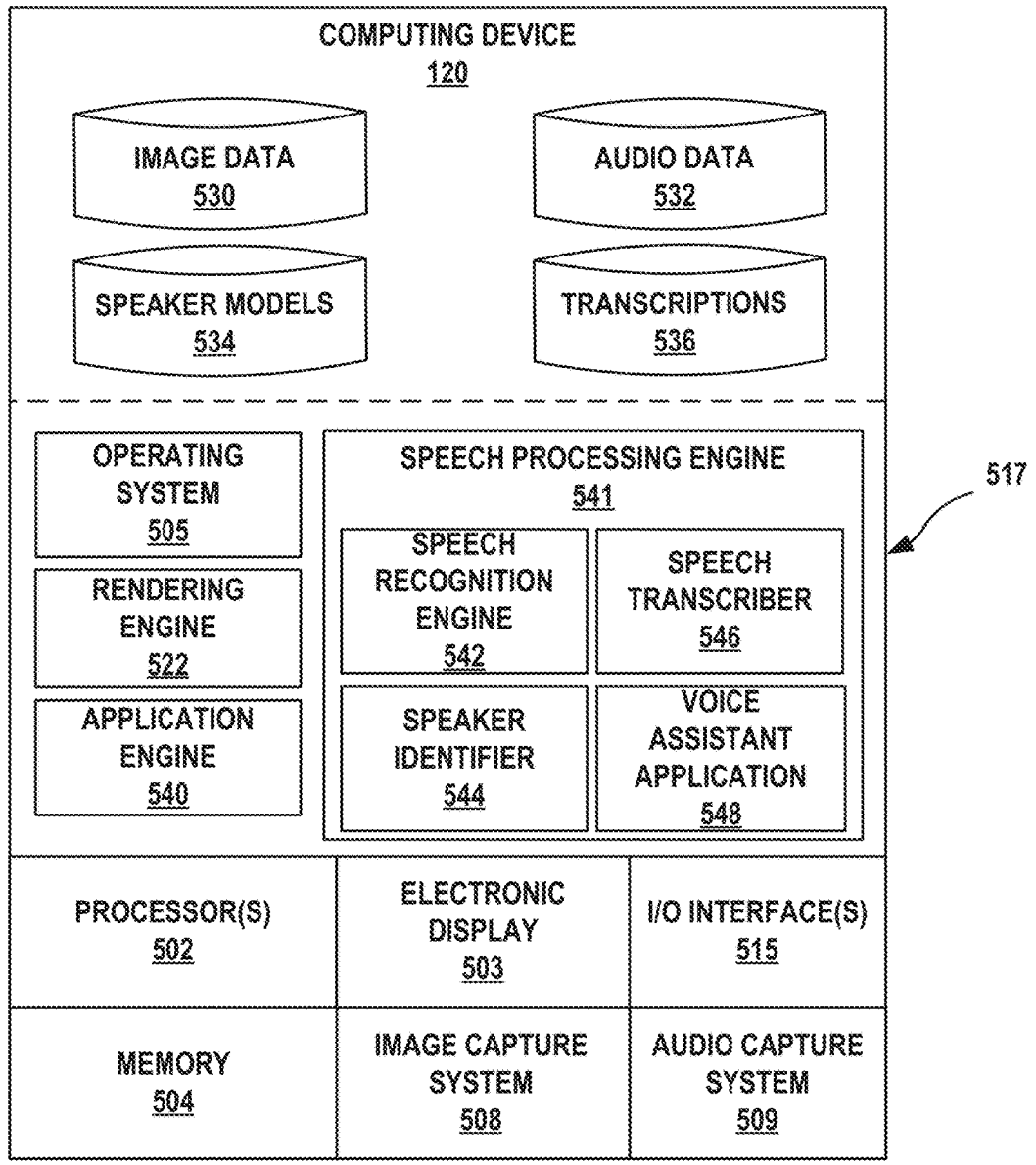
FIG. 5 is a block diagram showing example implementations in which speech transcription is performed by an example instance of the computing device of system of FIG. 1C in accordance with the techniques of the disclosure.

FIG. 5 is a block diagram showing example implementations in which speech transcription is performed by an example instance of the computing device 120 of system of FIG. 1C in accordance with the techniques of the disclosure. In the example of FIG. 5, computing device 120 performs image and audio data capture, speaker identification, transcription, and analysis operations as described above with reference to HMD 112 of FIG. 3.

In this example, computing device 120 includes one or more processors 502 and memory 504 that, in some examples, provide a computer platform for executing an operating system 505, which may be an embedded, real-time multitasking operating system, for instance, or other type of operating system. In turn, operating system 505 provides a multitasking operating environment for executing one or more software components 517. Processors 502 are coupled to one or more I/O interfaces 515, which provide I/O interfaces for communicating with other devices, such as a keyboard, a mouse, game controllers, display devices, image capture devices, other HMDs, and the like. Moreover, the one or more I/O interfaces 515 may include one or more wired or wireless network interface controllers (NICs) for communicating with a network, such as network 104. Additionally, processor(s) 502 are coupled to electronic display 503, image capture system 508, and audio capture system 509. Image capture system 208 and audio capture system 209 are configured to obtain image data and audio data, respectively.

Computing device 120 in FIG. 5 is shown as a single computing device, which may correspond to a mobile phone, a tablet, a smart watch, a gaming console, workstation, a desktop computer, laptop, or other computing device. In other examples, computing device 120 may be distributed across a plurality of computing devices, such as a distributed computing network, a data center, or a cloud computing system.

Software applications 517 of computing system operate to provide a transcription application. Similar to software applications 317 and 417 of FIGS. 3 and 4, respectively, software applications 517 include rendering engine 522, application engine 540, speech processing engine 541, image data 530, audio data 532, speaker models 534, and transcriptions 536. Similar to speech processing engines 341 and 441 of FIGS. 3 and 4, respectively, speech processing engine 541 includes speech recognition engine 542, speaker identifier 544, speech transcriber 546, and voice assistant application 548.

Similar to the manner in which HMD 112 processes audio and/or image data (e.g., as described above with respect to FIG. 3), computing system 120 captures audio and/or image data and transmits the audio and/or image data to transcription system 106, and speech recognition engine 441 of transcription system 106 recognizes speech segments in the audio data, identifies a speaker associated with each of the speech segments, transcribes each of the speech segments to produce a transcription including an indication of the speaker associated with each speech segment, and analyzes the transcription to produce additional data derived from the transcription.

In some examples, computing device 120 of FIG. 5 simply captures image data 530 and audio data 532 and transmits that data to transcription system 106. Transcription system 106 processes audio and/or image data received from computing device 120 in the same way that it processes audio and/or image data received from HMD 112 to produce a transcription including an indication of one or more speakers in speech segments contained in the audio data and to produce additional data from the additional data derived from the transcription (e.g., as described above with respect to FIG. 4).

In some examples, transcription system 106 receives audio and/or image data from both HMD 112 of FIG. 4 and computing device 120 of FIG. 5. In some examples, HMD 112 and computing device 120 may transmit audio and/or image data of the same physical environment or from different physical environments. By capturing audio and/or image data about the same environment from two or more different sources, a greater amount of information may be captured. For example, image data may be captured from two or more different perspective or audio data may be captured from two different points of an environment, which may enable different sounds to be captured. In some examples, transcription system 106 processes data from HMD 112 in the same or similar way as it processes data from computing device 120, and vice versa, and produces a single transcription from the data received from HMD 112 and computing device 120.

Figure 6:
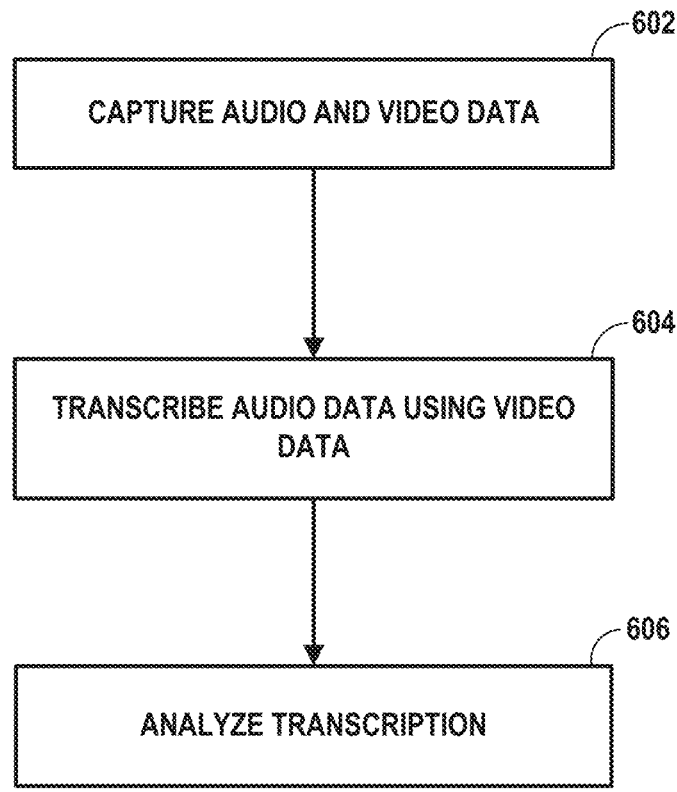
FIG. 6 is a flowchart illustrating example operations of a method for transcribing and analyzing speech in accordance with aspects of the disclosure.

FIG. 6 is a flowchart 600 illustrating example operations of a method for transcribing and analyzing speech in accordance with aspects of the disclosure. In some examples, one or more operations shown in FIG. 6 may be performed by HMD 112, computing device 120, and/or transcription system 106.

Audio capture system 209 and image capture system 208 of HMD 112 and/or audio capture system 509 and image capture system 508 of computing device 120 capture audio and image data (602). In some examples, the audio and/or image data is captured automatically or manually. For example, audio and/or image capture system of HMD 112 and/or of computing system 120 may be configured to always capture audio and/or image data when powered on. In some examples, multimedia capture system 138 of HMD 112 and/or multimedia system 138 of computing system 130 may be configured to capture multimedia data in response to user input initiating the data capture and/or in response to initiating a transcription, virtual conferencing, or voice assistant application. In some examples, HMD 112 and/or computing device 120 may transmit the audio and/or image data to transcription system 106 (e.g., in real-time, in near-real-time, or after an interaction is terminated).

Speech processing engine 341, 441, or 541 transcribes the audio data using the image data (604). For example, speech processing engine 341, 441, or 541 may recognize speech segments in the audio data, identify a speaker associated with each of the speech segments, and transcribe each of the speech segments to produce a transcription including an indication of the speaker associated with each speech segment.

Voice assistant application 348, 448, or 548 then analyzes the transcription to produce additional data derived from the transcription (606). For example, voice assistant application 348, 448, or 548 may produce additional data such as a calendar invitation for a meeting or event described in the transcription (e.g., corresponding to speech segment "Let's touch base again first thing Friday morning"), information related to topics identified in the transcription (e.g., a notification that a meeting invitee rejected the meeting invitation as shown in FIG. 1A, a notification to a person not present in an interaction), or a task list including tasks identified in the transcription (e.g., a task item corresponding to speech segment "Please send out the sales report for last month after the meeting.").

In some examples, the additional data may include statistics about the transcription including number of words spoken by the speaker, tone of the speaker, information about filler words used by the speaker (e.g., um, hmm, uh, like, etc.) percent of time each speaker spoke, information about profanity used, information about the length of words used, a summary of the transcription, or sentiment of the speaker (e.g., per segment or entire transcript). Voice assistant application 348, 448, or 548 may also produce a modified version of the speech segments associate with at least one of the plurality of speakers. For example, voice assistant application 348, 448, or 548 may generate an audio or video file with the voices of one or more speakers replaced by another voice (e.g., the voice of a cartoon or the voice of a celebrity) or replacing the language of one or more speech segments in an audio or video file. In some examples, voice assistant application 348, 448, or 548 analyzes the transcription in real-time (e.g., as the audio and image data is captured), in near-real-time, after an interaction is terminated, or after the HMD 112 or computing device 120 stops capturing image or image data.

Figure 7:
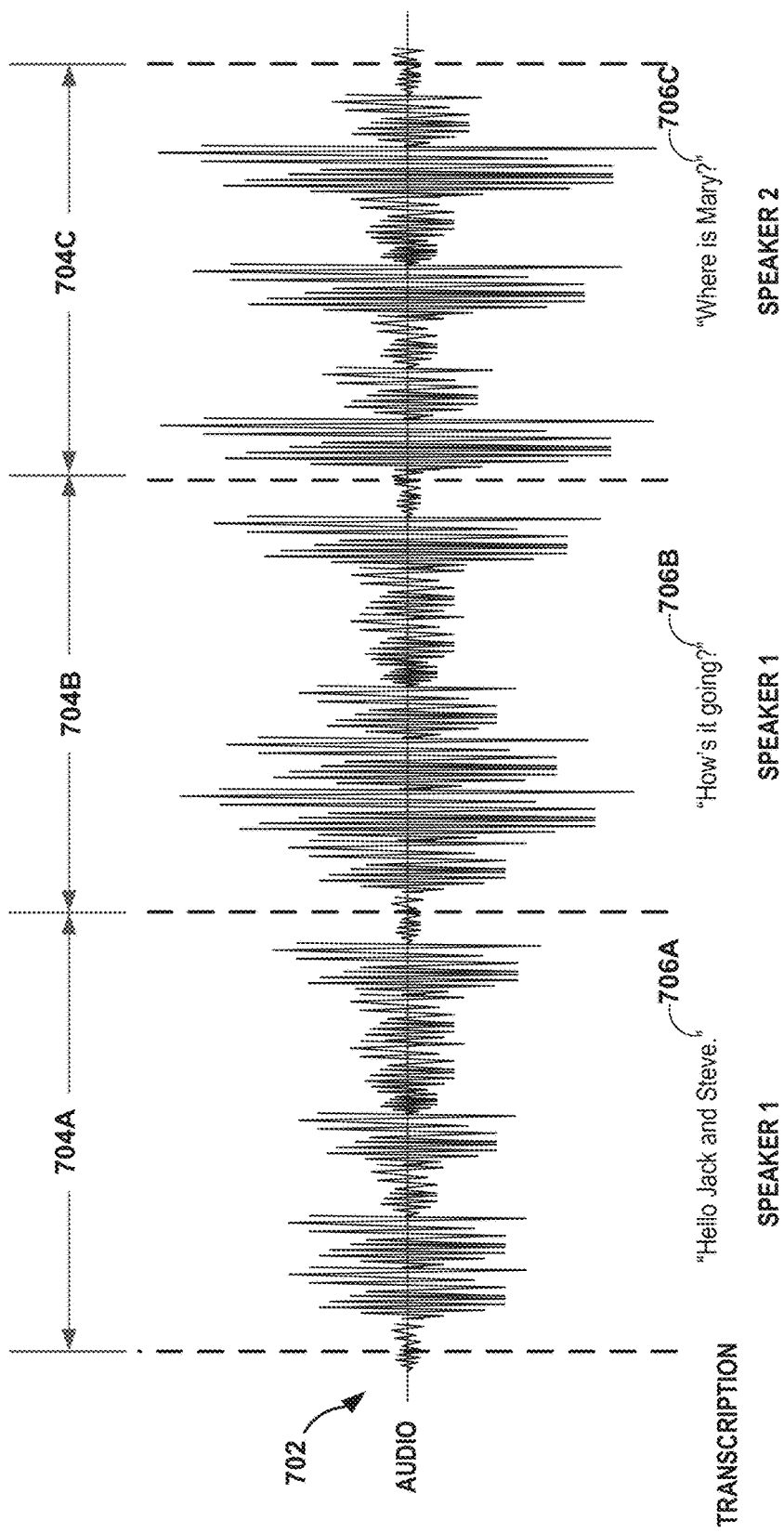
FIG. 7 illustrates audio data and a transcription in accordance with the techniques of the disclosure.

FIG. 7 illustrates audio data 702 and a transcription 706 in accordance with the techniques of the disclosure. In the example shown in FIG. 7, audio data 702 corresponds to the analog data captured by audio capture system 209 of HMD 112 or audio capture system 509 of computing device 120. Speech recognition engine 342, 442, or 552 recognizes speech segments 704A, 704B, 704C (collectively, "speech segments 704") in audio data 702 and generates corresponding transcribed speech segments 706A, 706B, and 706C (collectively "transcription 706"). While speech segments 704 each include entire sentences, speech segments may comprise one or more words. For example, speech segments might not always comprise entire sentences and may comprise single words or phrases. In some examples, speech recognition engine 342, 442, or 552 may combine one or more words to form speech segments comprising complete sentences as shown in FIG. 7.

In the example shown in FIG. 7, speaker identifier 344, 444, or 544 identifies "Speaker 1" as the speaker of speech segments 706A and 706B and identifies "Speaker 2" as the speaker of speech segment 706C (e.g., based on speaker models and/or image data as described above with reference to FIGS. 3-5). In some examples, the labels or identifiers "Speaker 1" and "Speaker 2" (inserted into the resulting transcription) may be automatically generated by speaker identifier 344, 444, or 544. In other examples, these identifiers or labels may be manually entered by a user and may comprise a name (e.g., "Jack," "Steve", "boss", etc.). Either way, these labels, identifiers, or names may provide an indication of the speaker that was the source of the speech segments in the transcription.

In some examples, voice assistant application 348, 448, or 548 may analyze transcription 706 to produce additional data. For example, voice assistant application 348, 448, or 548 may produce a notification (e.g., a notification that "Mary declined the meeting invitation" as shown in FIG. 1A). In some examples, the additional data may include statistics about the transcription including number of words spoken by the speaker, tone of the speaker, information about filler words used by the speaker (e.g., um, hmm, uh, like, etc.) percent of time each speaker spoke, information about profanity used, information about the length of words used, a summary of the transcription, or sentiment of the speaker (e.g., per segment or entire transcript). In another example, voice assistant application 348, 448, or 548 may generate audio or video data with the voices of Speaker 1 and/or Speaker 2 replaced by another voice (e.g., the voice of a cartoon or the voice of a celebrity) or replacing the language of any of speech segments 704 in an audio or video file.

Figure 8:
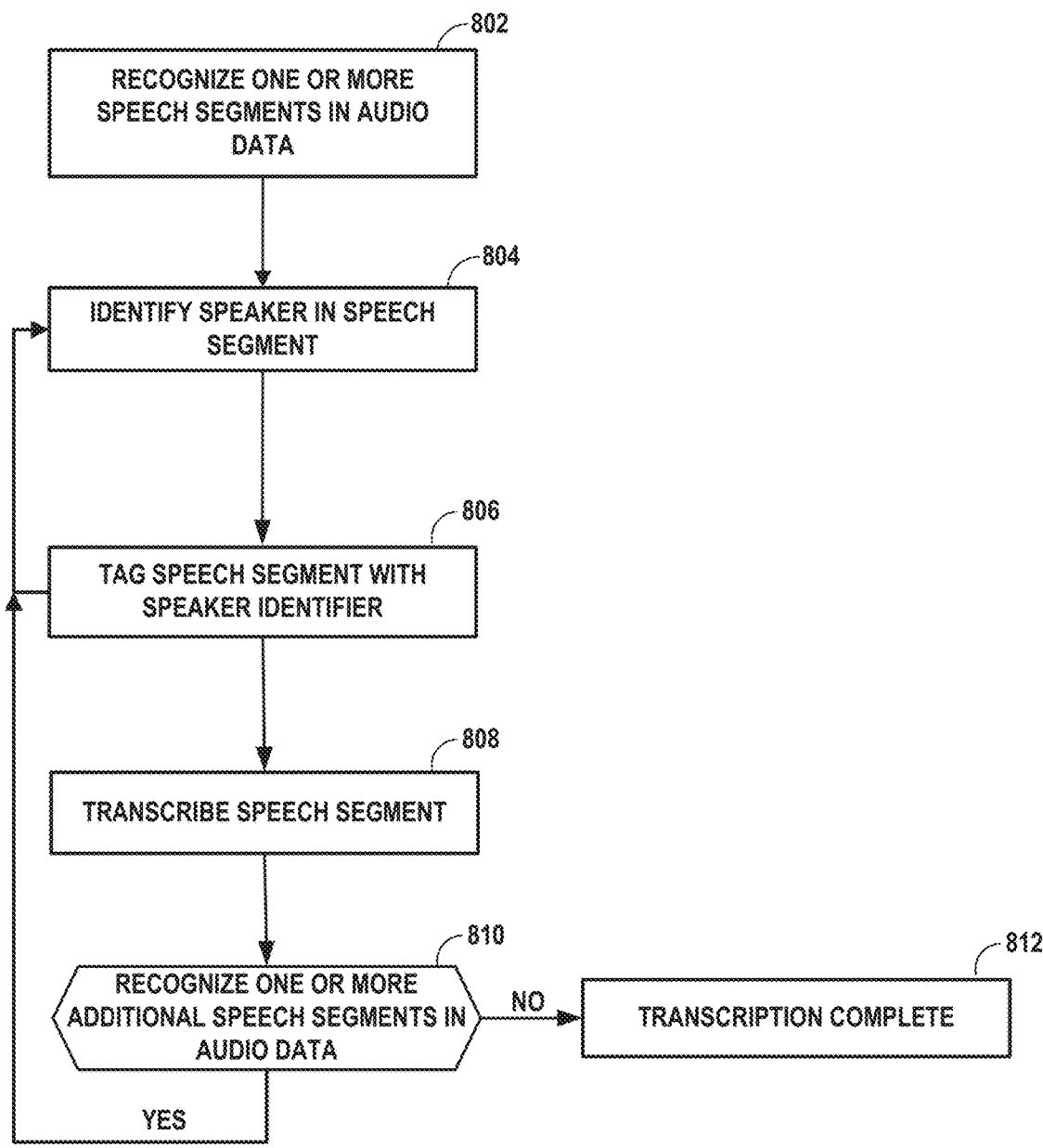
FIG. 8 is a flowchart illustrating example operations of a method for transcribing speech in accordance with aspects of the disclosure.

FIG. 8 is a flowchart 800 illustrating example operations of a method for transcribing speech in accordance with aspects of the disclosure. Flowchart 800 is one example of the functions performed by speech processing engine 341, 441, or 541 at element 604 of flowchart 600 in FIG. 6.

Initially, speech recognition engine 342, 442, or 542 recognizes one or more speech segments in audio data (e.g., audio data 332, 432, 532, or 702) (802). For example, speech recognition engine 342, 442, or 542 may convert the analog audio data 702 to digital data using an analog-to-digital converter (ADC), filter noise in the digitized audio data, and apply one or more statistical models (e.g., a Hidden Markov Model or neural networks) to the filtered digitized audio data to recognize speech segment 706A of FIG. 7. In some examples, the speech recognition engine 342, 442, or 542 may apply an AWL model trained to recognize speech for one or more specific users (e.g., user 110 of FIGS. 1A-1C) to the audio data 702. For example, speech recognition engine 342, 442, or 542 may apply an AI/ML model trained to only recognize speech for the user of HMD 112 (user 110). In some examples, the AI/ML, models may receive training feedback from the user to adjust the speech recognition determinations. In some examples, speech recognition engine 342, 442, or 542 may recognize one or more speech segments in audio data 332, 432, or 532 based on image data 330, 430, or 530. For example, speech recognition engine 342, 442, or 542 may be configured to detect faces with moving lips in the image data to recognize speech segments (e.g., the start and end of a speech segment).

Speaker identifier 344, 444, or 544 identifies a speaker associated with the recognized speech segment (804). For example, speaker identifier 344, 444, or 544 may identify Speaker 1 as the speaker of segment 704A in FIG. 7 based on sound intensity (e.g., volume) of speech segment 704A (e.g., sound intensity would be greater for speech originating from user of HMD 112A in FIG. 1B). In another example, speaker identifier 344, 444, or 544 may identify Speaker 2 as the speaker of segment 704C in FIG. 7 using image data captured by image capture system 208 of HMD 112 and/or image capture system 508 of computing device 120. For example, speaker identifier 344, 444, or 544 may be configured to detect faces with moving lips in image data 330, 430, or 530 to identify a speaker and may identify a speaker based on the detected face with moving lips and/or the focus of the image data (e.g., suggesting that user 110 is looking at the speaker). In another example, audio capture system 209 or 509 of HMD 112 or computing system 120, respectively, may comprise a microphone array that may capture information about the directionality of the audio source with respect to HMD 112 or computing device 120, respectively, and speaker identifier 344, 444, or 544 may identify a speaker or potential speakers based on that directionality information and image data 330, 430, or 530.

Speaker identifier 344, 444, or 544 tags the recognized speech segment with a speaker identifier (806). For example, speaker identifier 344, 444, or 544 tags speech segment 704A with the identifier "Speaker 1" in FIG. 7. As described above with respect to FIG. 7, in some examples, speaker identifier 344, 444, or 544 automatically generates the identifier "Speaker 1" for inclusion in transcription 706. In other examples, a user, administrator, or other source enters an identifier, label, or name for one or more segments. These labels, identifiers, or names may provide an indication of speaker of the speech segments in the transcription.

Speech transcriber 346, 446, or 546 transcribes the speech segment recognized by speech recognition engine 342, 442, or 542 (808). For example, speech transcriber 346, 446, or 546 produces the text output 706A for segment 704A in FIG. 7. Speech processing engine 341, 441, or 541 next determines whether speech recognition engine 342, 442, or 542 recognizes one or more additional speech segments in audio data (e.g., audio data 332, 432, 532, or 702) (810). If speech recognition engine 342, 442, or 542 recognizes one or more additional speech segments (YES branch of 810), then elements 804 through 810 are repeated. For example, speech recognition engine 342, 442, or 542 recognizes speech segment 704B (802), speaker identifier 344, 444, or 544 then identifies Speaker 1 as the speaker of speech segment 704B (804) and tags speech segment 704B with an indication that Speaker 1 is the speaker, and speech transcriber 346, 446, or 546 then transcribes speech segment 704B. This process may continue until no additional speech segments are recognized (e.g., when the interaction is terminated, when the audio/image data is no longer being captured, or when the entire audio data has been processed) (NO branch of 810), and the transcription is complete (812) (e.g., flowchart 600 may continue to 606 in FIG. 6).

In some examples, flowchart 800 processes audio and/or image data (e.g., audio and/or video streams or files) from two or more sources (e.g., received from two or more HMD 112 and/or computing device 120). In that instance, the operations of flowchart 800 may be repeated for each audio data stream or file. In some examples, flowchart 800 will combine the transcriptions of each audio data stream or file and produce a single full transcription including an indication of the speaker of each speech segment in the transcription. For example, flowchart 800 may combine the transcriptions using time stamps from each audio data file or stream.

Figure 9:
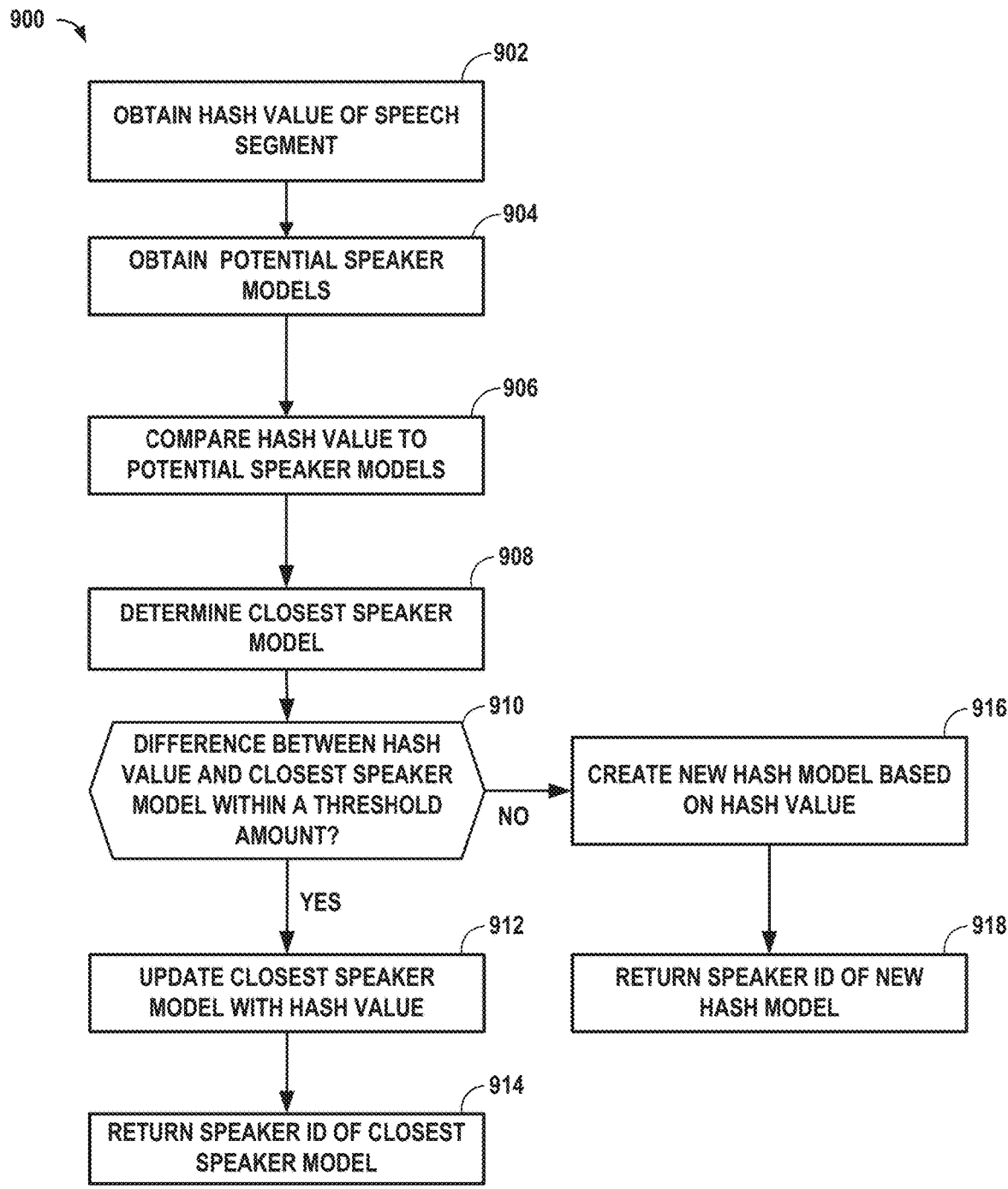
FIG. 9 is a flowchart illustrating example operations of a method for identifying a speaker of a speech segment in accordance with aspects of the disclosure.

FIG. 9 is a flowchart 900 illustrating example operations of a method for identifying a speaker of a speech segment in accordance with aspects of the disclosure. Flowchart 900 is one example of the functions performed by speaker identifier 344, 444, or 544 at element 804 of flowchart 800 in FIG. 8.

Speaker identifier 344, 444, 544 may determine a speech segment hash value for a speech segment (902). For example, speech processing engine 341, 441, or 541 may store each recognized speech segment in separate files (e.g., temporary files). These files may contain the analog audio data or a digitized version of the audio data (e.g., with noises other than speech having been filtered). Speaker identifier may apply a hash function to these individual files to determine a speech segment hash value for each speech segment. Speaker identifier 344, 444, 544 may obtain potential speaker models from speaker models 334, 434, or 534 (904) and compare the speech segment hash value to the hash values of the potential speaker models (906). Speaker identifier 344, 444, 544 identifies the closest speaker model with a hash value closest to the speech segment hash value (908).

If the difference between the speech segment hash value and the closest speaker models is equal to or greater than a threshold difference (NO branch of 910), speaker identifier 344, 444, or 544 may create a new speaker model based on the speech segment hash value (916). For example, speaker identifier 344, 444, or 544 will determine a new speaker identifier (ID) for the speech segment hash value and store the new speaker ID and speech segment hash value as a new speaker model in speaker models 334, 434, or 534. Speaker identifier 344, 444, or 544 will then return the new speaker ID as the speaker for the speech segment (918) (e.g., flowchart 800 may continue to 806 in FIG. 8 with the new speaker ID).

If the difference between the speech segment hash value for a speech segment and the hash value of the closest speaker models is less than the threshold difference (YES branch of 910), speaker identifier 344, 444, or 544 updates the closest speaker model based on the speech segment hash value (912). For example, the hash value of the closest speaker model may comprise an average hash value of all speech segments associated with that speaker and speaker identifier 344, 444, or 544 may incorporate the speech segment hash value into that average. Speaker identifier 344, 444, or 544 will then return the speaker ID of the closest speaker model as the speaker for the speech segment (914) (e.g., flowchart 800 may continue to 806 in FIG. 8 with the speaker ID associated with the closest speaker model).

Figure 10:
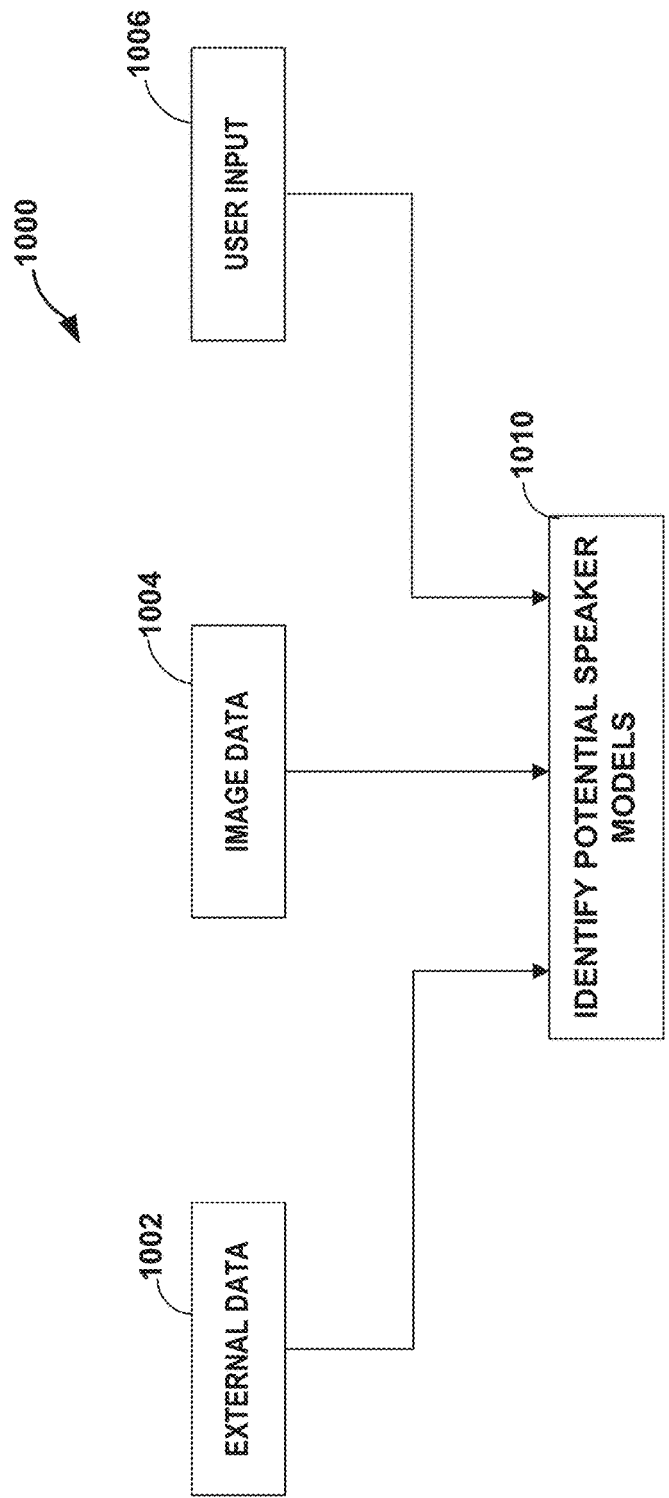
FIG. 10 is a flowchart illustrating example operations of a method for identifying potential speaker models in accordance with aspects of the disclosure.

FIG. 10 is a flowchart 1000 illustrating example operations of a method for identifying potential speaker models in accordance with aspects of the disclosure. Flowchart 1000 is one example of the functions performed by speaker identifier 344, 444, or 544 at element 904 of flowchart 900 in FIG. 9.

Speaker identifier 344, 444, or 544 may identify potential speaker models (1010) based many inputs. For example, speaker identifier 344, 444, or 544 may obtain external data (1002) and process that external data to identify one or more potential speaker models (1010). In some examples, the external data may include location information (e.g., GPS coordinates) of one or more users. For example, speaker identifier 344, 444, or 544 may determine one or more users (or devices associated with one or more users) within the vicinity (e.g., within 50 feet) of HMD 112 or computing device 120 and use that information to obtain the speaker models associated with those users/devices (e.g., from speaker models 334, 434, or 534). In some examples, the external information can comprise calendar information, including invitee information for a meeting, location information for the meeting, and an indication of whether each invitee plans to attend the meeting. In some examples, speaker identifier 344, 444, or 544 will identify the speaker models corresponding to all invitees in the calendar information. In other examples, speaker identifier 344, 444, or 544 will identify the speaker models corresponding to all invitees in the calendar information that plan to attend the meeting.

In some examples, speaker identifier 344, 444, or 544 may obtain image data (1004) and process that image data to identify one or more potential speaker models (1010). For example, speaker identifier 344, 444, or 544 may be configured to detect faces in the image data and identify the speaker models associated with the detected faces (e.g., from speaker models 334, 434, or 534). In other examples, speaker identifier 344, 444, or 544 may be configured to detect faces with moving lips in the image data that correspond to recognized speech segments in audio data and identify the speaker models associated with the detected faces with moving lips (e.g., from speaker models 334, 434, or 534). In some examples, speaker identifier 344, 444, or 544 may apply AI/ML models trained to identify faces and/or faces with moving lips in images to the image data. In another example, audio capture system 209 or 509 of HMD 112 or computing system 120, respectively, may comprise a microphone array that may capture information about the directionality of the audio source with respect to HMD 112 or computing device 120, respectively, and speaker identifier 344, 444, or 544 may identify a speaker or potential speakers based on that directionality information and detected faces in image data. For example, speaker identifier 344, 444, or 544 may identify Speaker 2 as the speaker of speech segment 704C in FIG. 7 based on the directionality information about speech segment 704 and the correspondence of that directionality to the face of person 101A in FIG. 1C. In yet another example, speaker identifier 344, 444, or 544 will identify the speaker based on who the user focuses on (e.g., based on the field of view of the HMD 112).

In some examples, speaker identifier 344, 444, or 544 may receive user input (1006) and process that user input to identify one or more potential speaker models (1010). For example, may identify the speakers or speaker models (e.g., from speaker models 334, 434, or 534). In other examples, a user may confirm potential speaker models identified based on external data or image data.

Figure 11:
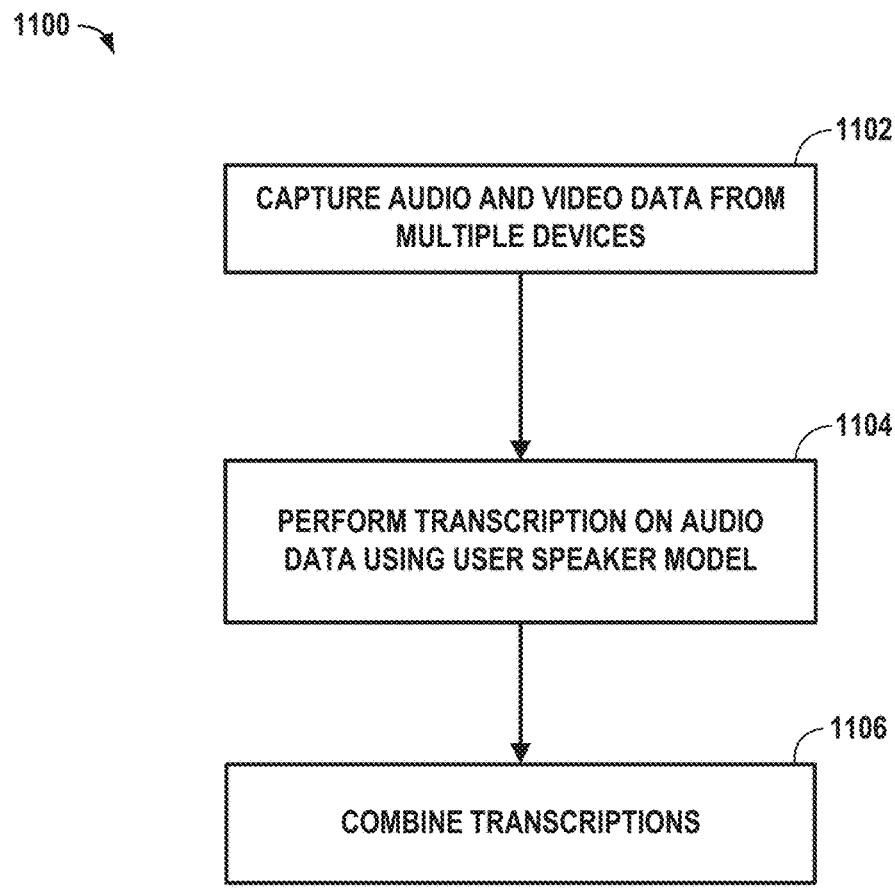
FIG. 11 is a flowchart illustrating example operations of a method for transcribing speech for distributed devices in accordance with aspects of the disclosure.

FIG. 11 is a flowchart 1100 illustrating example operations of a method for transcribing speech for distributed devices in accordance with aspects of the disclosure. In some examples, one or more operations shown in FIG. 11 may be performed by HMD 112, computing device 120, and/or transcription system 106.

Audio capture system 209 and image capture system 208 of HMD 112 and/or audio capture system 509 and image capture system 508 of computing device 120 capture audio and image data (1102). For example, two or more HMDs 112 and/or computing devices 120 may capture audio and/or image data (e.g., from the same or different physical environments).

Speech processing engine 341, 441, or 541 transcribes the audio data using the image data for each device using a user speaker model (e.g., a speaker model specific to the user of the device) (1104). For example, the speech processing engine of HMD 112A transcribes the speech segments corresponding to user 110 (e.g., using a speaker model specific to user 110), the speech processing engine of HMD 112B transcribes the speech segments corresponding to user 101A (e.g., using a speaker model specific to user 101A), and the speech processing engine of HMD 112C transcribes the speech segments corresponding to user 102A (e.g., using a speaker model specific to user 102A) in FIG. 1B. In some examples, the user logs into the HMD 112 or computing device 120 or otherwise identifies him or herself as the user. In other examples, the HMD 112 or computing device 120 automatically identifies the user (e.g., using voice and/or face recognition techniques described above). For example, speech processing engine 341, 441, or 541 transcribe each of the speech segments to produce a transcription including an indication of the speaker associated with each speech segment. In some examples, any of HMD 112A, 112B, and/or 112C of FIG. 1C may capture audio and image data and transmit that audio and image data to transcription system 106 for transcription (e.g., as described above with reference to FIG. 4). For example, transcription system 106 may receive audio and image data from one or more of HMD 112A, 112B, and/or 112C of FIG. 1C and transcribe audio data for each device.

Speech processing engine 341, 441, or 541 then combines all of the transcriptions corresponding to the speech segments in the audio data captured by the two or more HMDs 112 and/or computing devices 120 to produce one full transcription including an indication of the speaker/user associated with each transcribed speech segment (1106). For example, each of HMDs 112A, 112B, and 112C may transmit the individual transcriptions of captured speech from users 110, 101A, and 102A, respectively, to transcription system 106, which will combine the individual transcriptions. In another example, HMDs 112B and 112C may transmit the individual transcriptions of captured speech from users 101A and 102A, respectively, to HMD 112A, which will combine the individual transcriptions. In some examples, voice assistant application 348, 448, or 548 then optionally analyzes the individual and/or full transcriptions to produce additional data derived from the transcription (e.g., as described above with reference to FIG. 6).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example, and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example, and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example, and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example, and not by way of limitation, a first user may view one or more second users of an online social network through a "People You May Know" function of the online social network, or by viewing a list of friends of the first user. As an example, and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example, and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example, and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example, and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example, and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example, and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

What is claimed is:

1. A system comprising:
   an audio capture system configured to capture audio data associated with a plurality of speakers;
   an image capture system configured to capture images of one or more of the plurality of speakers; and
   a speech processing engine configured to:
      recognize a plurality of speech segments in the audio data,
      access external data;
      identify, for each speech segment of the plurality of speech segments and based on the images and the external data, a speaker associated with the speech segment, wherein the external data includes location information associated with the speaker,
      transcribe each of the plurality of speech segments to produce a transcription of the plurality of speech segments including, for each speech segment in the plurality of speech segments, an indication of which speaker is associated with the speech segment, and
      analyze the transcription to produce additional data derived from the transcription.

2. The system of claim 1, wherein to recognize the plurality of speech segments, the speech processing engine is further configured to recognize, based on the images, the plurality of speech segments.

3. The system of claim 2, wherein to identify the speaker, the speech processing engine is further configured to detect one or more faces in the images.

4. The system of claim 2, wherein the speech processing engine is further configured to choose, based on the identity of the speaker associated with each speech segment, one or more speech recognition models.

5. The system of claim 4, wherein to identify, for each speech segment of the plurality of speech segments, the speaker, the speech processing engine is further configured to detect one or more faces in the images with moving lips.

6. The system of claim 1, wherein the external data further includes one or more of calendar information and information about meeting invitees.

7. The system of claim 4, further comprising a head-mounted display (HMD) capable of being worn by a user, and wherein the one or more speech recognition models comprises a voice recognition model for the user.

8. The system of claim 4, further comprising a head-mounted display (HMD) capable of being worn by a user, wherein the speech processing engine is further configured to identify the user of the HIVID as the speaker of the plurality of speech segments based on attributes of the plurality of speech segments.

9. The system of claim 1, wherein the audio capturing system comprises a microphone array.

10. The system of claim 7, wherein the HMD is configured to output artificial reality content, and wherein the artificial reality content comprises a virtual conferencing application including a video stream and an audio stream.

11. The system of claim 1, wherein the additional data comprises one or more of a calendar invitation for a meeting or event described in the transcription, information related to topics identified in the transcription, or a task list including tasks identified in the transcription.

12. The system of claim 1, wherein the additional data comprises at least one of: statistics about the transcription including number of words spoken by the speaker, tone of the speaker, information about filler words used by the speaker, percent of time the speaker spoke, information about profanity used, information about the length of words used, a summary of the transcription, or sentiment of the speaker.

13. The system of claim 1, wherein the additional data includes an audio stream including a modified version of the speech segments associated with at least one of the plurality of speakers.

14. A method comprising:
  capturing audio data associated with a plurality of speakers;
  capturing images of one or more of the plurality of speakers;
  recognizing a plurality of speech segments in the audio data;
  accessing external data;
  identifying, for each speech segment of the plurality of speech segments and based on the images and the external data, a speaker associated with the speech segment, wherein the external data includes location information associated with the speaker;
  transcribing each of the plurality of speech segments to produce a transcription of the plurality of speech segments including, for each speech segment in the plurality of speech segments, an indication of which speaker is associated with the speech segment; and
  analyzing the transcription to produce additional data derived from the transcription.

15. The method of claim 14, wherein the external data further includes one or more of calendar information and information about meeting invitees.

16. The method of claim 14, wherein the additional data comprises one or more of a calendar invitation for a meeting or event described in the transcription, information related to topics identified in the transcription, or a task list including tasks identified in the transcription.

17. The method of claim 14, wherein the additional data comprises at least one of: statistics about the transcription including number of words spoken by the speaker, tone of the speaker, information about filler words used by the speaker, percent of time the speaker spoke, information about profanity used, information about the length of words used, a summary of the transcription, or sentiment of the speaker.

18. A non-transitory computer-readable storage medium comprising instructions that, when executed, configure processing circuitry of a computing system to:
  capture audio data associated with a plurality of speakers;
  capture images of one or more of the plurality of speakers;
  recognize a plurality of speech segments in the audio data;
  access external data;
  identify, for each speech segment of the plurality of speech segments and based on the images and the external data, a speaker associated with the speech segment, wherein the external data includes location information associated with the speaker;
  transcribe each of the plurality of speech segments to produce a transcription of the plurality of speech segments including, for each speech segment in the plurality of speech segments, an indication of which speaker is associated with the speech segment; and
  analyze the transcription to produce additional data derived from the transcription.

* * * * *

UNITED STATES PATENT AND TRADEMARK OFFICE
CERTIFICATE OF CORRECTION

PATENT NO. : 11,227,602 B2
APPLICATION NO. : 16/689662
DATED : January 18, 2022
INVENTOR(S) : Cheung et al.

Page 1 of 1

It is certified that error appears in the above-identified patent and that said Letters Patent is hereby corrected as shown below:

On the Title Page

Item (72) Replace: "Yating Sasha Sheng, San Francisco, CA (US)" with --Yating Sheng, San Francisco, CA (US)--

Signed and Sealed this
Third Day of May, 2022

*Katherine Kelly Vidal*

Katherine Kelly Vidal
*Director of the United States Patent and Trademark Office*